United States Patent
Gissin et al.

(10) Patent No.: US 11,762,581 B2
(45) Date of Patent: Sep. 19, 2023

(54) METHOD, DEVICE, AND SYSTEM FOR CONTROLLING DATA READ/WRITE COMMAND IN NVME OVER FABRIC ARCHITECTURE

(71) Applicant: HUAWEI TECHNOLOGIES CO.,LTD., Guangdong (CN)

(72) Inventors: Victor Gissin, Shenzhen (CN); Xin Qiu, Shenzhen (CN); Pei Wu, Hangzhou (CN); Huichun Qu, Hangzhou (CN); Jinbin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 16/415,995

(22) Filed: May 17, 2019

(65) Prior Publication Data

US 2019/0272123 A1    Sep. 5, 2019

Related U.S. Application Data

(63) Continuation of application No. PCT/CN2016/108600, filed on Dec. 5, 2016.

(51) Int. Cl.
*G06F 3/06* (2006.01)
*G06F 13/16* (2006.01)
(Continued)

(52) U.S. Cl.
CPC .......... *G06F 3/0659* (2013.01); *G06F 3/0604* (2013.01); *G06F 3/0656* (2013.01);
(Continued)

(58) Field of Classification Search
CPC .... G06F 3/0659; G06F 13/4221; G06F 13/28; G06F 3/0604; G06F 3/0656;
(Continued)

(56) References Cited

U.S. PATENT DOCUMENTS 8,578,106 B1    11/2013 Shapiro
9,026,735 B1 *   5/2015 Torok .................... G06F 12/023
                                                    711/129
(Continued)

FOREIGN PATENT DOCUMENTS

CN          101013409 A        8/2007
CN          101093466 A       12/2007
(Continued)

OTHER PUBLICATIONS

NVM Express over Fabrics 1.0, Jun. 5, 2016, 49 pages.
(Continued)

*Primary Examiner* — David Yi
*Assistant Examiner* — Alan Otto
(74) *Attorney, Agent, or Firm* — James Anderson Harrison

(57) ABSTRACT

A method, device, and system for controlling a data read/write command in an NVMe over fabric architecture. In the method provided in the embodiments of the present disclosure, a data processing unit receives a control command sent by a control device, the data processing unit divides a storage space of a buffer unit into at least two storage spaces according to the control command sent by the control device, and establishes a correspondence between the at least two storage spaces and command queues, and after receiving a first data read/write command that is in a first command queue and that is sent by the control device, the data processing unit buffers, in a storage space that is of the buffer unit and that is corresponding to the first command queue, data to be transmitted according to the first data read/write command.

8 Claims, 9 Drawing Sheets

(51) Int. Cl.
  *G06F 13/40* (2006.01)
  *G06F 13/42* (2006.01)
  *G06F 13/28* (2006.01)
(52) U.S. Cl.
  CPC ........ *G06F 3/0679* (2013.01); *G06F 13/1668* (2013.01); *G06F 13/28* (2013.01); *G06F 13/4027* (2013.01); *G06F 13/4221* (2013.01)
(58) Field of Classification Search
  CPC .............. G06F 3/0679; G06F 13/1668; G06F 13/4027; G06F 9/5016; G06F 9/5022; G06F 9/546; G06F 2209/54
  See application file for complete search history.

(56) References Cited

U.S. PATENT DOCUMENTS

| | | |
|---|---|---|
| 2007/0177430 A1 | 8/2007 | Morio |
| 2008/0052432 A1 | 2/2008 | Wilson et al. |
| 2009/0193182 A1 | 7/2009 | Nitta |
| 2009/0216960 A1* | 8/2009 | Allison ............... G06F 13/1642 711/149 |
| 2011/0208913 A1 | 8/2011 | Suzuki et al. |
| 2013/0042056 A1 | 2/2013 | Shats et al. |
| 2014/0215001 A1 | 7/2014 | Tucek et al. |
| 2014/0344826 A1* | 11/2014 | Wu ...................... G06F 9/4843 718/104 |
| 2015/0019798 A1 | 1/2015 | Huang |
| 2015/0254088 A1 | 9/2015 | Chou et al. |
| 2015/0317088 A1 | 11/2015 | Hussain et al. |
| 2015/0317091 A1 | 11/2015 | Hussain et al. |
| 2015/0356020 A1 | 12/2015 | Desai et al. |
| 2015/0378606 A1 | 12/2015 | Huang et al. |
| 2016/0077740 A1 | 3/2016 | Hussain et al. |
| 2016/0179718 A1 | 6/2016 | Morris et al. |
| 2017/0083252 A1* | 3/2017 | Singh .................... G06F 3/0659 |
| 2018/0060259 A1 | 3/2018 | Morris et al. |
| 2018/0121354 A1 | 5/2018 | Ishiyama |
| 2018/0188952 A1 | 7/2018 | Carlton et al. |

FOREIGN PATENT DOCUMENTS

| | | |
|---|---|---|
| CN | 101387943 A | 3/2009 |
| CN | 101499036 A | 8/2009 |
| CN | 102075436 A | 5/2011 |
| CN | 102103545 A | 6/2011 |
| CN | 102169363 A | 8/2011 |
| CN | 103135957 A | 6/2013 |
| CN | 104272257 A | 1/2015 |
| CN | 104536701 A | 4/2015 |
| CN | 105718391 A | 6/2016 |
| CN | 106095694 A | 11/2016 |

OTHER PUBLICATIONS

Li Bigang et al.,"Design and implementation of cache mechanism based on IP network in TH-MSNS", High-Tech Communication, vol. 15, Issue 12, Dec. 2005, with an English abstract, total 5 pages.

* cited by examiner

FIG. 1 - Prior Art

METHOD, DEVICE, AND SYSTEM FOR CONTROLLING DATA READ/WRITE COMMAND IN NVME OVER FABRIC ARCHITECTURE

CROSS-REFERENCE TO RELATED APPLICATIONS

This application is a continuation of International Application No. PCT/CN2016/108600, filed on Dec. 5, 2016, the disclosure of which is hereby incorporated by reference in its entirety.

TECHNICAL FIELD

The present disclosure relates to the field of information technologies, and in particular, to a method, device, and system for controlling a data read/write command in a non-volatile memory express NVMe over fabric (NVMe over fabric) architecture.

BACKGROUND

Non-volatile memory express (NVMe) is a controller interface standard in which queue transmission mechanisms between an NVMe device and a host that are connected using a Peripheral Component Interconnect Express (PCIe) bus.

The published NVMe standard for a PCIe architecture has made a great success in the industry, and the NVMe standard can be extended for use in data centers. However, because of a limited quantity of existing PCIe networks in the data center field and disadvantages (scalability, a long-distance connection, and the like) of a PCIe protocol, an NVMe protocol is being promoted in the industry to run in networks such as iWarp, remote direct memory access over Converged Ethernet (ROCE), Infiniband, a fiber channel (FC), and Omni-Path, to provide more flexible and wider application. In the industry, the application of running the NVMe protocol in networks such as the iWarp, the ROCE, the Infiniband, the FC, and the Omni-Path is referred to as NVMe over fabric (NOF for short).

In an NVMe over fabric architecture, a host represents a host, and the host is responsible for initiating data reading/writing, and a target represents a target storage device, responsible for receiving and executing a command sent by the host. After the target receives a write command sent by the host, a network adapter in the target parses content in the write command to obtain a length of data to be transmitted according to the write command, and allocates a corresponding storage space in a network adapter memory, to buffer data that is to be transmitted by the host. After buffering the data to be transmitted, the network adapter in the target migrates the buffered data to a destination hard disk in the target. The host reads, using a similar implementation process, the data from the hard disk in the target using a read command. That is, the data in the hard disk in the target needs to be first buffered in the network adapter memory, and then the data buffered in the network adapter memory is sent to the host.

In a further service implementation, the host sends plurality commands to the target within a time period. When plurality commands need to be sent, the commands are processed in parallel using plurality queues in the NVMe over Fabric architecture. When there are plurality commands in the plurality queues, data to be read/written according to a command in a queue may occupy most of a storage space of the network adapter memory of the network adapter. Consequently, a command in another queue cannot be executed in time because no sufficient storage space can be obtained by means of application to buffer data that needs to be read/written. An unexecuted command needs to wait for release of a memory space, and reapply for an available memory space, and the like. In such an implementation, a network adapter in a target has a complex implementation and poor maintainability when processing a case of an insufficient network adapter memory.

SUMMARY

Embodiments of the present disclosure provide a method, device, and system for controlling a data read/write command in an NVMe over fabric architecture, so as to resolve a problem of a complex processing mechanism caused when a data read/write command in a particular queue fails to be executed because of an insufficient storage space caused by execution of a data read/write command in another queue.

According to one aspect, an embodiment of the present disclosure provides a method for controlling a data read/write command between a control device and a storage device in an NVMe over fabric architecture, where the storage device includes a data processing unit, a buffer unit, and a storage unit, data that needs to be read/written by the control device is stored in the storage unit, the data processing unit is configured to receive a data read/write command sent by the control device, the buffer unit is configured to buffer data to be transmitted according to the data read/write command, and the method includes the following steps:

receiving, by the data processing unit, a control command sent by the control device, where the control command includes information used for dividing a storage space of the buffer unit into at least two storage spaces;

dividing, by the data processing unit, the storage space of the buffer unit into at least two storage spaces according to the control command, and establishing a correspondence between the at least two storage spaces and command queues, where the command queue is a queue including a data read/write control command sent by the control device; and receiving, by the data processing unit, a first data read/write command sent by the control device, and buffering, according to the correspondence between the at least two storage spaces and the command queues, data to be transmitted according to the first data read/write command into a storage space that is of the buffer unit and that is corresponding to a first command queue, where the first data read/write command is a data read/write command in the first command queue.

According to the method, each storage space obtained through division in a buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

Optionally, in the NVMe over fabric architecture, the control device may be connected to and communicate with the storage device using a network such as iWarp, ROCE, Infiniband, an FC, or Omni-Path.

The data processing unit in the storage device may be implemented by a network adapter, a separate FPGA chip, or a central processing unit (CPU) in the storage device. The buffer unit in the storage device may be implemented by a network adapter memory, a storage unit in the FPGA chip, the buffer unit in the storage device, or a memory of the CPU in the storage device. Alternatively, the buffer unit in the storage device may be implemented by a buffer resource pool including at least two of a network adapter memory, a storage unit in the FPGA chip, the buffer unit in the storage device, or a memory of the CPU in the storage device.

In a possible design, the establishing, by the data processing unit, a correspondence between the at least two storage spaces and command queues includes:

establishing, by the data processing unit, the correspondence between the at least two storage spaces and the command queues according to correspondence information carried in the control command, where the correspondence information is a correspondence between at least two storage spaces of the buffer unit and command queues; or establishing, by the data processing unit, the correspondence between the at least two storage spaces and the command queues according to the at least two storage spaces obtained through division.

In a possible design, the method further includes:

obtaining, within a preset time, an occupation proportion of the storage space that is of the buffer unit and that is corresponding to the first command queue and an occupation proportion of a storage space that is of the buffer unit and that is corresponding to a second command queue; and when the occupation proportion of the storage space that is of the buffer unit and that is corresponding to the first command queue is greater than a preset first threshold, and the occupation proportion of the storage space that is of the buffer unit and that is corresponding to the second command queue is less than a preset second threshold, reducing the storage space that is of the buffer unit and that is corresponding to the second command queue, and allocating the reduced storage space that is of the buffer unit and that is corresponding to the second command queue to the storage space that is of the buffer unit and that is corresponding to the first command queue, where the first threshold is greater than the second threshold.

Storage spaces of the buffer unit that are to be allocated to different command queues are adjusted, such that the storage spaces of the buffer unit can be flexibly allocated according to an actual situation. Therefore, resources of the buffer unit can be maximally used, a problem of a large amount of data to be transmitted according to data read/write commands in some command queues can be resolved, and a service processing capability can be improved while a resource waste is avoided.

Optionally, a correspondence between each storage space of the buffer unit and a command queue may be: One command queue is corresponding to one storage space, or a queue group including at least two command queues is corresponding to one storage space. In this way, the buffer unit can be allocated more flexibly, so as to allocate storage resources of the buffer unit to different command queues.

Optionally, a manner of dividing the storage space of the buffer unit includes but is not limited to: dividing the storage space according to a size of the storage space of the buffer unit, dividing the storage space according to quality of service of different command queues, or dividing the storage space according to priorities of different command queues.

In an optional implementation, when the buffer unit includes the network adapter memory and the memory of the CPU in the storage device, a command queue corresponding to a storage space allocated to the network adapter memory has a high priority or a high requirement for quality of service (QoS), a command queue corresponding to a storage space allocated to the memory of the CPU in the storage device has a low priority or a low requirement for QoS, or the like. Data is quickly and efficiently buffered when the network adapter memory is used as the buffer unit. Therefore, when the storage space of the network adapter memory is allocated to a command queue with a high priority, a service requirement of a command with a high priority can be met. It may be understood that, when the buffer unit includes the storage unit in the FPGA chip and the memory of the CPU in the storage device, a command queue corresponding to a storage space allocated to the storage unit in the FPGA chip may have a high priority or a high requirement for QoS, a command queue corresponding to a storage space allocated to the memory of the CPU in the storage device may have a low priority or a low requirement for QoS, or the like.

Optionally, the data processing unit may further bind, according to the control command from the control device, plurality command queues together to form a queue group. A storage space that is of the buffer unit and that is corresponding to the command queue group is a sum of storage spaces corresponding to all the command queues in the queue group. In this way, the storage space of the buffer unit can be further configured more flexibly, so as to meet different requirements of different command queues for storage spaces of the buffer unit.

In a possible design, the method further includes:

obtaining, by the control device, an available storage space that is of the buffer unit and that is corresponding to the first command queue;

determining, by the control device, whether a storage space occupied by first data to be transmitted according to the first data read/write command is less than or equal to the available storage space that is of the buffer unit and that is corresponding to the first command queue; and sending the first data read/write command to the storage device when the storage space occupied by the first data is less than or equal to the available storage space that is of the buffer unit and that is corresponding to the first command queue; or suspending sending of the first data read/write command when the storage space occupied by the first data is greater than the available storage space that is of the buffer unit and that is corresponding to the first command queue.

In this way, the control device sends the first data read/write command in the first command queue only when data that needs to be transmitted can be buffered in the storage space that is of the buffer unit and that is corresponding to the first command queue. Therefore, a problem of a complex processing mechanism caused by buffering a command in the first command queue when an available storage space in the storage space that is of the buffer unit and that is corresponding to the first command queue is insufficient can be avoided.

In a possible design, the obtaining, by the control device, an available storage space that is of the buffer unit and that is corresponding to the first command queue includes:

before sending the first data read/write command to the storage device, sending, by the control device to the data processing unit, a request for obtaining the available storage space that is of the buffer unit and that is corresponding to the first command queue, so as to obtain the available storage space that is of the buffer unit and that is corresponding to the first command queue.

In a possible design, before the sending, by the control device to the data processing unit, a request for obtaining the available storage space that is of the buffer unit and that is corresponding to the first command queue, the method further includes:

sending, by the control device, a second data read/write command to the storage device, where data to be transmitted according to the second data read/write command is greater than the available storage space that is of the buffer unit and that is corresponding to the first command queue; and receiving, by the control device, a backpressure message sent by the data processing unit, where the backpressure message is used to indicate insufficiency of the available storage space that is of the buffer unit and that is corresponding to the first command queue.

In the foregoing manner, the control device may not need to send, each time of sending a data read/write command, a request for obtaining an available storage space in a storage space that is of the buffer unit and that is corresponding to a command queue to which the to-be-sent command belongs, but send the foregoing obtaining request only after receiving a backpressure message returned by the data processing unit for indicating that data cannot be buffered. In this way, resource consumption of the control device can be reduced, and resource consumption generated when the data processing unit returns the backpressure message can also be accordingly reduced.

In a possible design, the method further includes:

after sending of the first data read/write command has been suspended for a preset time, re-obtaining, by the control device, the available storage space that is of the buffer unit and that is corresponding to the first command queue, and sending the first data read/write command to the storage device when the storage space occupied by the first data is less than or equal to the available storage space that is of the buffer unit and that is corresponding to the first command queue.

Optionally, the preset time for which sending of the first data read/write command has been suspended by the control device may be a default time in a system or a preconfigured time. In addition, the preset time for which sending of the first data read/write command has been suspended by the control device may be flexibly set according to a specific service status.

In a possible design, only within a preset time, the control device performs the Step of obtaining an available storage space that is of the buffer unit and that is corresponding to the first command queue, and determining whether a storage space occupied by first data to be transmitted according to the first data read/write command is less than or equal to the available storage space that is of the buffer unit and that is corresponding to the first command queue. The preset time may be set differently according to different service scenarios. Within the preset time, the available storage space of the buffer unit cannot meet storage space requirements of data to be transmitted according to all data read/write commands sent by the control device. After the preset time expires, the available storage space of the buffer unit can meet a storage space requirement of data to be transmitted according to a data read/write command sent by the control device.

Further, after receiving a backpressure message sent by the data processing unit, the control device further re-transmits the second data read/write command. That is, for the second data read/write command that cannot be executed in time because the storage space that is of the buffer unit and that is corresponding to the first command queue is insufficient, the control device resends the second data read/write command when the control device determines that the storage space that is of the buffer unit and that is corresponding to the first command queue is greater than the data to be transmitted according to the second data read/write command.

In a possible design, an available storage space of the buffer unit is a locally recorded real-time available storage space that is of the buffer unit and that is corresponding to the first command queue.

The "locally recorded" means that the available storage space is recorded in the control device, and the locally recorded real-time available storage space of the buffer unit is a real-time available storage space that is of the buffer unit and that is recorded in the control device.

Optionally, the control device may obtain and record the available storage space of the buffer unit when the storage device is powered on and initialized. Alternatively, the control device may obtain and record the available storage space of the buffer unit at any time after the storage device is powered on and initialized.

Optionally, a form of the real-time available storage space that is of the buffer unit and that is recorded in the control device may be a size of a space that is of the buffer unit and that can store data or a quantity of data blocks that can be written.

Optionally, the control device stores, in a dedicated storage space such as a dedicated chip, the real-time available storage space in the storage space that is of the buffer unit and that is corresponding to the first command queue. Alternatively, the real-time available storage space in the storage space that is of the buffer unit and that is corresponding to the first command queue may be stored in an existing storage component of the control device, for example, a cache of a CPU of the control device, or a cache of a network adapter of the control device, or may be stored in a storage space of a separate FPGA chip.

The control device sends the first data read/write command when the data to be transmitted according to the first data read/write command can be buffered in the storage space that is of the buffer unit and that is corresponding to the first command queue. Therefore, a problem of a complex processing mechanism caused by buffering a command in the first command queue when the storage space that is of the buffer unit and that is corresponding to the first command queue is insufficient can be avoided.

In a possible design, after sending the first data read/write command, the control device subtracts the storage space occupied by the first data from the locally recorded real-time available storage space that is of the buffer unit and that is corresponding to the first command queue; and after receiving a response message that is sent by the data processing unit and indicates completion of the first data read/write command, the control device adds the storage space occupied by the first data and the locally recorded real-time available storage space that is of the buffer unit and that is corresponding to the first command queue.

After the control device sends the first data read/write command, the data to be transmitted according to the first data read/write command occupies the storage space that is of the buffer unit and that is corresponding to the first command queue. Therefore, the storage space occupied by the first data needs to be subtracted from the recorded real-time available storage space that is of the buffer unit and that is corresponding to the first command queue. After the control device receives the response message that is sent by the data processing unit and indicates completion of the first data read/write command, the first data has been migrated out from the buffer unit corresponding to the first command queue. Therefore, the storage space occupied by the first data and the recorded real-time available storage space that is of the buffer unit and that is corresponding to the first command queue need to be added. In this way, a latest available storage space that is of the buffer unit and that is corresponding to the first command queue can be correctly recorded.

In a possible design, the method further includes:

after sending of the first data read/write command has been suspended by the control device for a preset time, re-determining, by the control device, whether the storage space occupied by the first data is less than or equal to the locally recorded real-time available storage space that is of the buffer unit and that is corresponding to the first command queue, and sending the first data read/write command to the storage device when the storage space occupied by the first data is less than or equal to the locally recorded real-time available storage space that is of the buffer unit and that is corresponding to the first command queue.

Optionally, the control device stores, in a dedicated storage space such as a dedicated chip, the real-time available storage space in the storage space that is of the buffer unit and that is corresponding to the first command queue. Alternatively, the real-time available storage space in the storage space that is of the buffer unit and that is corresponding to the first command queue may be stored in an existing storage component of the control device, for example, a cache of a CPU of the control device, or a cache of a network adapter of the control device, or may be stored in a storage space of an FPGA chip.

Optionally, when the first data read/write command is a write command, the data to be transmitted according to the first data read/write command is to-be-stored data. The write command carries an SGL. The SGL includes a field. For example, the field may be an entry. The field includes information such as a source address that is of the to-be-stored data and that is in the control device, a length of the to-be-stored data, and a destination address that is of the to-be-stored data and that is in the storage device.

The data processing unit buffers, according to the source address that is of the to-be-stored data and in the control device and that is carried in the SGL in the write command, the to-be-stored data in the storage space that is of the buffer unit and that is corresponding to the first command queue. Optionally, the data processing unit may receive the to-be-stored data in a remote direct memory access (RDMA) manner using the network adapter in the control device.

After the to-be-stored data is buffered in the storage space that is of the buffer unit and that is corresponding to the first command queue, the data processing unit modifies the write command, and modifies the source address that is of the to-be-stored data and in the control device and that is carried in the write command into an address that is in the buffer unit and corresponding to the first command queue and that is used for storing the to-be-stored data, and sends the modified write command to a controller of a destination hard disk. That is, an SGL carried in the write command sent by the data processing unit to the controller of the destination hard disk includes information such as the address that is in the buffer unit and corresponding to the first command queue and that is used for storing the to-be-stored data, the length of the to-be-stored data, and the destination address that is of the to-be-stored data and that is in the storage device.

After determining the destination hard disk, the data processing unit sends the modified write command to the controller of the destination hard disk. The controller of the destination hard disk reads the to-be-stored data from the buffer unit according to the address that is of the to-be-stored data and in the buffer unit and that is carried in the received write command, for example, reads the to-be-stored data in an RDMA manner or a direct memory access (DMA) manner, and writes the read to-be-stored data into a storage space corresponding to the destination hard disk.

When the first data read/write command is a read command, the data to be transmitted according to the first data read/write command is to-be-read data. The read command carries an SGL. The SGL includes information such as a source address that is of the to-be-read data and that is in the storage device, a length of the to-be-read data, and a destination address that is in the control device and into which the to-be-read data is to be written.

After receiving the read command, the data processing unit modifies the read command, modifies the destination address that is of the to-be-read data and in the control device and that is carried in the read command into an address, used for buffering the to-be-read data, in the storage space that is of the buffer unit and that is corresponding to the first command queue, and sends the modified read command to a controller of a destination hard disk. That is, an SGL carried in the read command sent by the data processing unit to the controller of the destination hard disk includes information such as the source address that is of the to-be-read data and that is in the storage device, the length of the to-be-read data, and the address, used for buffering the to-be-read data, in the storage space that is of the buffer unit and that is corresponding to the first command queue. The controller of the destination hard disk migrates, according to the received and modified read command, the to-be-read data to the storage space that is of the buffer unit and that is corresponding to the first command queue. Optionally, the controller of the destination hard disk migrates, in an RDMA manner, the to-be-read data to the storage space that is of the buffer unit and that is corresponding to the first command queue.

After the to-be-read data is buffered in the storage space that is of the buffer unit and that is corresponding to the first command queue, the data processing unit sends the buffered to-be-read data to the control device according to the destination address, into which the to-be-read data is to be written, that is in the control device and that is in the read command. Optionally, the data processing unit sends the buffered to-be-read data to the control device in an RDMA manner.

In a possible design, the data processing unit is connected to the storage unit using an NVMe over Peripheral Component Interconnect Express PCIe, NVMe over PCIe, architecture.

In a possible design, the data processing unit includes a controller, the controller is configured to control transmission of data buffered in the buffer unit to the storage unit, and the controller is a physical controller or a non-volatile memory controller in the NVMe over fabric architecture.

According to another aspect, an embodiment of the present disclosure provides a method for controlling a data read/write command between a control device and a storage device in an NVMe over fabric architecture, where the storage device includes a data processing unit, a buffer unit, and a storage unit, data that needs to be read/written by the control device is stored in the storage unit, the data processing unit is configured to receive a data read/write command sent by the control device, the buffer unit is configured to buffer data to be transmitted according to the data read/write command, and the method includes:

sending, by the control device, a control command to the data processing unit, where the control command includes information used for dividing a storage space of the buffer unit into at least two storage spaces, such that the data processing unit divides the storage space of the buffer unit into at least two storage spaces according to the control command, and establishes a correspondence between the at least two storage spaces and command queues, where the command queue is a queue including a data read/write control command sent by the control device; and sending, by the control device, a first data read/write command to the storage device, where data to be transmitted according to the first data read/write command is buffered in a storage space that is of the buffer unit and that is corresponding to a first command queue, and the first data read/write command is a data read/write command in the first command queue.

According to the method, the control device sends a control command, such that the buffer unit is divided into different storage spaces. Each storage space is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

Optionally, in the NVMe over fabric architecture, the control device may be connected to and communicate with the storage device using a network such as iWarp, ROCE, Infiniband, an FC, or Omni-Path.

The data processing unit in the storage device may be implemented by a network adapter, an FPGA chip, or a CPU in the storage device. The buffer unit in the storage device may be implemented by a network adapter memory, a storage unit in the FPGA chip, the buffer unit in the storage device, or a memory of the CPU in the storage device. Alternatively, the buffer unit in the storage device may be implemented by a buffer resource pool including at least two of a network adapter memory, a storage unit in the FPGA chip, the buffer unit in the storage device, or a memory of the CPU in the storage device.

Optionally, a correspondence between each storage space of the buffer unit and a command queue may be: One command queue is corresponding to one storage space, or a queue group including at least two command queues is corresponding to one storage space. In this way, the buffer unit can be allocated more flexibly, so as to allocate storage resources of the buffer unit to different command queues.

Optionally, a manner of dividing the storage space of the buffer unit includes but is not limited to: dividing the storage space according to a size of the storage space of the buffer unit, dividing the storage space according to quality of service of different command queues, or dividing the storage space according to priorities of different command queues.

In an optional implementation, when the buffer unit includes the network adapter memory and the memory of the CPU in the storage device, a command queue corresponding to a storage space allocated to the network adapter memory has a high priority or a high requirement for QoS, a command queue corresponding to a storage space allocated to the memory of the CPU in the storage device has a low priority or a low requirement for QoS, or the like. Data is quickly and efficiently buffered when the network adapter memory is used as the buffer unit. Therefore, when a command queue with a high priority is allocated to the storage space of the network adapter memory, a service requirement of a command with a high priority can be met. It may be understood that, when the buffer unit includes the storage unit in the FPGA chip and the memory of the CPU in the storage device, a command queue corresponding to a storage space allocated to the storage unit in the FPGA chip may have a high priority or a high requirement for QoS, a command queue corresponding to a storage space allocated to the memory of the CPU in the storage device may have a low priority or a low requirement for QoS, or the like.

In a possible design, the method further includes:

obtaining, by the control device, an available storage space that is of the buffer unit and that is corresponding to the first command queue;

determining, by the control device, whether a storage space occupied by first data to be transmitted according to the first data read/write command is less than or equal to the available storage space that is of the buffer unit and that is corresponding to the first command queue; and sending the first data read/write command to the storage device when the storage space occupied by the first data is less than or equal to the available storage space that is of the buffer unit and that is corresponding to the first command queue; or suspending sending of the first data read/write command when the storage space occupied by the first data is greater than the available storage space that is of the buffer unit and that is corresponding to the first command queue.

In this way, the control device sends the first data read/write command in the first command queue only when data that needs to be transmitted can be buffered in the storage space that is of the buffer unit and that is corresponding to the first command queue. Therefore, a problem of a complex processing mechanism caused by buffering a command in the first command queue when an available storage space in the storage space that is of the buffer unit and that is corresponding to the first command queue is insufficient can be avoided.

In a possible design, the obtaining, by the control device, an available storage space that is of the buffer unit and that is corresponding to the first command queue includes:

before sending the first data read/write command to the storage device, sending, by the control device to the data processing unit, a request for obtaining the available storage space that is of the buffer unit and that is corresponding to the first command queue, so as to obtain the available storage space that is of the buffer unit and that is corresponding to the first command queue.

In a possible design, before the sending, by the control device to the data processing unit, a request for obtaining the available storage space that is of the buffer unit and that is corresponding to the first command queue, the method further includes:

sending, by the control device, a second data read/write command to the storage device, where data to be transmitted according to the second data read/write command is greater than the available storage space that is of the buffer unit and that is corresponding to the first command queue; and receiving, by the control device, a backpressure message sent by the data processing unit, where the backpressure message is used to indicate insufficiency of the available storage space that is of the buffer unit and that is corresponding to the first command queue.

In the foregoing manner, the control device may not need to send, each time of sending a data read/write command, a request for obtaining an available storage space in a storage space that is of the buffer unit and that is corresponding to a command queue to which the to-be-sent command belongs, but send the foregoing obtaining request only after receiving a backpressure message returned by the data processing unit for indicating that data cannot be buffered. In this way, resource consumption of the control device can be reduced, and resource consumption generated when the data processing unit returns the backpressure message can also be accordingly reduced.

In a possible design, the available storage space of the buffer unit is a locally recorded real-time available storage space that is of the buffer unit and that is corresponding to the first command queue.

The "locally recorded" means that the available storage space is recorded in the control device, and the locally recorded real-time available storage space of the buffer unit is a real-time available storage space that is of the buffer unit and that is recorded in the control device.

Optionally, the control device may obtain and record the available storage space of the buffer unit when the storage device is powered on and initialized. Alternatively, the control device may obtain and record the available storage space of the buffer unit at any time after the storage device is powered on and initialized.

Optionally, a form of the real-time available storage space that is of the network adapter memory and that is recorded in the control device may be a size of a space that is of the buffer unit and that can store data or a quantity of data blocks that can be written.

Optionally, the control device stores, in a dedicated storage space such as a dedicated chip, the real-time available storage space in the storage space that is of the buffer unit and that is corresponding to the first command queue. Alternatively, the real-time available storage space in the storage space that is of the buffer unit and that is corresponding to the first command queue may be stored in an existing storage component of the control device, for example, a cache of a CPU of the control device, or a cache of a network adapter of the control device, or may be stored in a storage space of a separate FPGA chip.

In a possible design, the method further includes:

after sending the first data read/write command, subtracting, by the control device, the storage space occupied by the first data from the locally recorded real-time available storage space that is of the buffer unit and that is corresponding to the first command queue; and after receiving a response message that is sent by the data processing unit and indicates completion of the first data read/write command, adding, by the control device, the storage space occupied by the first data and the locally recorded real-time available storage space that is of the buffer unit and that is corresponding to the first command queue.

After the control device sends the first data read/write command, the data to be transmitted according to the first data read/write command occupies the storage space that is of the buffer unit and that is corresponding to the first command queue. Therefore, the storage space occupied by the first data needs to be subtracted from the recorded real-time available storage space that is of the buffer unit and that is corresponding to the first command queue. After the control device receives the response message that is sent by the data processing unit and indicates completion of the first data read/write command, the first data has been migrated out from the buffer unit corresponding to the first command queue. Therefore, the storage space occupied by the first data and the recorded real-time available storage space that is of the buffer unit and that is corresponding to the first command queue need to be added. In this way, a latest available storage space that is of the buffer unit and that is corresponding to the first command queue can be correctly recorded.

According to another aspect, an embodiment of the present disclosure further provides a storage device, where the storage device is a storage device in an NVMe over fabric architecture, data is transmitted between the storage device and a control device in the NVMe over fabric architecture, the storage device includes a data processing unit and a buffer unit, the data processing unit is configured to receive a data read/write command sent by the control device, the buffer unit is configured to buffer data to be transmitted according to the data read/write command, the data processing unit includes a processor, and the processor is configured to perform the following steps:

receiving a control command sent by the control device, where the control command includes information used for dividing a storage space of the buffer unit into at least two storage spaces;

dividing the storage space of the buffer unit into at least two storage spaces according to the control command, and establishing a correspondence between the at least two storage spaces and command queues, where the command queue is a queue including a data read/write control command sent by the control device; and receiving a first data read/write command sent by the control device, and buffering, according to the correspondence between the at least two storage spaces and the command queues, data to be transmitted according to the first data read/write command into a storage space that is of the buffer unit and that is corresponding to a first command queue, where the first data read/write command is a data read/write command in the first command queue.

Optionally, in the NVMe over fabric architecture, the control device may be connected to and communicate with the storage device using a network such as iWarp, ROCE, Infiniband, an FC, or Omni-Path.

The data processing unit in the storage device may be implemented by a network adapter, an FPGA chip, or a CPU in the storage device. The buffer unit in the storage device may be implemented by a network adapter memory, a storage unit in the FPGA chip, the buffer unit in the storage device, or a memory of the CPU in the storage device. Alternatively, the buffer unit in the storage device may be implemented by a buffer resource pool including at least two of a network adapter memory, a storage unit in the FPGA chip, the buffer unit in the storage device, or a memory of the CPU in the storage device.

In a possible design, the establishing, by the processor, a correspondence between the at least two storage spaces and command queues includes:

establishing the correspondence between the at least two storage spaces and the command queues according to correspondence information carried in the control command, where the correspondence information is a correspondence between at least two storage spaces of the buffer unit and command queues; or establishing the correspondence between the at least two storage spaces and the command queues according to the at least two storage spaces obtained through division.

In a possible design, the processor is further configured to:

obtain, within a preset time, an occupation proportion of the storage space that is of the buffer unit and that is corresponding to the first command queue and an occupation proportion of a storage space that is of the buffer unit and that is corresponding to a second command queue; and when the occupation proportion of the storage space that is of the buffer unit and that is corresponding to the first command queue is greater than a preset first threshold, and the occupation proportion of the storage space that is of the buffer unit and that is corresponding to the second command queue is less than a preset second threshold, reduce the storage space that is of the buffer unit and that is corresponding to the second command queue, and allocate the reduced storage space that is of the buffer unit and that is corresponding to the second command queue to the storage space that is of the buffer unit and that is corresponding to the first command queue, where the first threshold is greater than the second threshold.

Storage spaces of the buffer unit that are to be allocated to different command queues are adjusted, such that the storage spaces of the buffer unit can be flexibly allocated according to an actual situation. Therefore, resources of the buffer unit can be maximally used, a problem of a large amount of data to be transmitted according to data read/write commands in some command queues can be resolved, and a service processing capability can be improved while a resource waste is avoided.

Optionally, a correspondence between each storage space of the buffer unit and a command queue may be: One command queue is corresponding to one storage space, or a queue group including at least two command queues is corresponding to one storage space. In this way, the buffer unit can be allocated more flexibly, so as to allocate storage resources of the buffer unit to different command queues.

Optionally, a manner of dividing the storage space of the buffer unit includes but is not limited to: dividing the storage space according to a size of the storage space of the buffer unit, dividing the storage space according to quality of service of different command queues, or dividing the storage space according to priorities of different command queues.

In an optional implementation, when the buffer unit includes the network adapter memory and the memory of the CPU in the storage device, a command queue corresponding to a storage space allocated to the network adapter memory has a high priority or a high requirement for QoS, a command queue corresponding to a storage space allocated to the memory of the CPU in the storage device has a low priority or a low requirement for QoS, or the like. Data is quickly and efficiently buffered when the network adapter memory is used as the buffer unit. Therefore, when a command queue with a high priority is allocated to the storage space of the network adapter memory, a service requirement of a command with a high priority can be met. It may be understood that, when the buffer unit includes the storage unit in the FPGA chip and the memory of the CPU in the storage device, a command queue corresponding to a storage space allocated to the storage unit in the FPGA chip may have a high priority or a high requirement for QoS, a command queue corresponding to a storage space allocated to the memory of the CPU in the storage device may have a low priority or a low requirement for QoS, or the like.

According to another aspect, an embodiment of the present disclosure further provides a control device, where the control device is a control device in an NVMe over fabric architecture, the control device includes a processor, a network adapter, and a bus, the processor is connected to the network adapter using the bus, data is transmitted between the control device and a storage device in the NVMe over fabric architecture, the storage device includes a data processing unit, a buffer unit, and a storage unit, data that needs to be read/written by the control device is buffered in the buffer unit of the storage device and stored in the storage unit of the storage device, and the processor is configured to perform the following steps:

sending a control command to the data processing unit, where the control command includes information used for dividing a storage space of the buffer unit into at least two storage spaces, such that the data processing unit divides the storage space of the buffer unit into at least two storage spaces according to the control command, and establishes a correspondence between the at least two storage spaces and command queues, where the command queue is a queue including a data read/write control command sent by the control device; and sending a first data read/write command to the storage device, where data to be transmitted according to the first data read/write command is buffered in a storage space that is of the buffer unit and that is corresponding to a first command queue, and the first data read/write command is a data read/write command in the first command queue.

Optionally, in the NVMe over fabric architecture, the control device may be connected to and communicate with the storage device using a network such as iWarp, ROCE, Infiniband, an FC, or Omni-Path.

The data processing unit in the storage device may be implemented by a network adapter, an FPGA chip, or a CPU in the storage device. The buffer unit in the storage device may be implemented by a network adapter memory, a storage unit in the FPGA chip, the buffer unit in the storage device, or a memory of the CPU in the storage device. Alternatively, the buffer unit in the storage device may be implemented by a buffer resource pool including at least two of a network adapter memory, a storage unit in the FPGA chip, the buffer unit in the storage device, or a memory of the CPU in the storage device.

Optionally, a correspondence between each storage space of the buffer unit and a command queue may be: One command queue is corresponding to one storage space, or a queue group including at least two command queues is corresponding to one storage space. In this way, the buffer unit can be allocated more flexibly, so as to allocate storage resources of the buffer unit to different command queues.

Optionally, a manner of dividing the storage space of the buffer unit includes but is not limited to: dividing the storage space according to a size of the storage space of the buffer unit, dividing the storage space according to quality of service of different command queues, or dividing the storage space according to priorities of different command queues.

In an optional implementation, when the buffer unit includes the network adapter memory and the memory of the CPU in the storage device, a command queue corresponding to a storage space allocated to the network adapter memory has a high priority or a high requirement for QoS, a command queue corresponding to a storage space allocated to the memory of the CPU in the storage device has a low priority or a low requirement for QoS, or the like. Data is quickly and efficiently buffered when the network adapter memory is used as the buffer unit. Therefore, when a command queue with a high priority is allocated to the storage space of the network adapter memory, a service requirement of a command with a high priority can be met. It may be understood that, when the buffer unit includes the storage unit in the FPGA chip and the memory of the CPU in the storage device, a command queue corresponding to a storage space allocated to the storage unit in the FPGA chip may have a high priority or a high requirement for QoS, a command queue corresponding to a storage space allocated to the memory of the CPU in the storage device may have a low priority or a low requirement for QoS, or the like.

In a possible design, the processor is further configured to:

obtain, within a preset time, an occupation proportion of the storage space that is of the buffer unit and that is corresponding to the first command queue and an occupation proportion of a storage space that is of the buffer unit and that is corresponding to a second command queue; and when the occupation proportion of the storage space that is of the buffer unit and that is corresponding to the first command queue is greater than a preset first threshold, and the occupation proportion of the storage space that is of the buffer unit and that is corresponding to the second command queue is less than a preset second threshold, send an adjustment command to the data processing unit, where the adjustment command is used for reducing the storage space that is of the buffer unit and that is corresponding to the second command queue, and allocating the reduced storage space that is of the buffer unit and that is corresponding to the second command queue to the storage space that is of the buffer unit and that is corresponding to the first command queue, where the first threshold is greater than the second threshold.

Storage spaces of the buffer unit that are to be allocated to different command queues are adjusted, such that the storage space of the buffer unit can be flexibly allocated according to an actual situation. Therefore, resources of the buffer unit can be maximally used, a problem of a large amount of data to be transmitted according to data read/write commands in some command queues can be resolved, and a service processing capability is improved while a resource waste is avoided.

In a possible design, the processor is further configured to perform the following steps:

obtaining an available storage space that is of the buffer unit and that is corresponding to the first command queue;

determining whether a storage space occupied by first data to be transmitted according to the first data read/write command is less than or equal to the available storage space that is of the buffer unit and that is corresponding to the first command queue; and sending the first data read/write command to the storage device when the storage space occupied by the first data is less than or equal to the available storage space that is of the buffer unit and that is corresponding to the first command queue; or suspending sending of the first data read/write command when the storage space occupied by the first data is greater than the available storage space that is of the buffer unit and that is corresponding to the first command queue.

In this way, the control device sends the first data read/write command in the first command queue only when data that needs to be transmitted can be buffered in the storage space that is of the buffer unit and that is corresponding to the first command queue. Therefore, a problem of a complex processing mechanism caused by buffering a command in the first command queue when an available storage space in the storage space that is of the buffer unit and that is corresponding to the first command queue is insufficient can be avoided.

In a possible design, the obtaining, by the processor, an available storage space of the buffer unit includes:

before sending the first data read/write command to the storage device, sending, by the processor to the data processing unit, a request for obtaining the available storage space that is of the buffer unit and that is corresponding to the first command queue, so as to obtain the available storage space that is of the buffer unit and that is corresponding to the first command queue.

In a possible design, before the sending, by the processor to the data processing unit, a request for obtaining the available storage space that is of the buffer unit and that is corresponding to the first command queue, the processor is further configured to perform the following steps:

sending a second data read/write command to the storage device, where data to be transmitted according to the second data read/write command is greater than the available storage space that is of the buffer unit and that is corresponding to the first command queue; and receiving a backpressure message sent by the data processing unit, where the backpressure message is used to indicate insufficiency of the available storage space that is of the buffer unit and that is corresponding to the first command queue.

In the foregoing manner, the control device may not need to send, each time of sending a data read/write command, a request for obtaining an available storage space in a storage space that is of the buffer unit and that is corresponding to a command queue to which the to-be-sent command belongs, but send the foregoing obtaining request only after receiving a backpressure message returned by the data processing unit for indicating that data cannot be buffered. In this way, resource consumption of the control device can be reduced, and resource consumption generated when the data processing unit returns the backpressure message can also be accordingly reduced.

In a possible design, the available storage space of the buffer unit is a locally recorded real-time available storage space that is of the buffer unit and that is corresponding to the first command queue.

The "locally recorded" means that the available storage space is recorded in the control device, and the locally recorded real-time available storage space of the buffer unit is a real-time available storage space that is of the buffer unit and that is recorded in the control device.

Optionally, the control device may obtain and record the available storage space of the buffer unit when the storage device is powered on and initialized. Alternatively, the control device may obtain and record the available storage space of the buffer unit at any time after the storage device is powered on and initialized.

Optionally, a form of the real-time available storage space that is of the network adapter memory and that is recorded in the control device may be a size of a space that is of the buffer unit and that can store data or a quantity of data blocks that can be written.

Optionally, the control device stores, in a dedicated storage space such as a dedicated chip, the real-time available storage space in the storage space that is of the buffer unit and that is corresponding to the first command queue. Alternatively, the real-time available storage space in the storage space that is of the buffer unit and that is corresponding to the first command queue may be stored in an existing storage component of the control device, for example, a cache of a CPU of the control device, or a cache of the network adapter of the control device, or may be stored in a storage space of a separate FPGA chip.

In a possible design, the processor is further configured to perform the following steps:

after sending the first data read/write command, subtracting the storage space occupied by the first data from the locally recorded real-time available storage space that is of the buffer unit and that is corresponding to the first command queue; and after receiving a response message that is sent by the data processing unit and indicates completion of the first data read/write command, adding the storage space occupied by the first data and the locally recorded real-time available storage space that is of the buffer unit and that is corresponding to the first command queue.

According to another aspect, an embodiment of the present disclosure provides a system for controlling a data read/write command, where the system includes a control device and a storage device in an NVMe over fabric architecture, the storage device includes a data processing unit, a buffer unit, and a storage unit, data that needs to be read/written by the control device is stored in the storage unit, the data processing unit is configured to receive a data read/write command sent by the control device, and the buffer unit is configured to buffer data to be transmitted according to the data read/write command, where the control device is configured to send a control command to the data processing unit, where the control command includes information used for dividing a storage space of the buffer unit into at least two storage spaces;

the data processing unit is configured to: divide the storage space of the buffer unit into at least two storage spaces according to the control command, and establish a correspondence between the at least two storage spaces and command queues, where the command queue is a queue including a data read/write control command sent by the control device; and the data processing unit is further configured to: receive a first data read/write command sent by the control device, and buffer, according to the correspondence between the at least two storage spaces and the command queues, data to be transmitted according to the first data read/write command into a storage space that is of the buffer unit and that is corresponding to a first command queue, where the first data read/write command is a data read/write command in the first command queue.

According to the system, each storage space obtained through division in a buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

Optionally, in the NVMe over fabric architecture, the control device may be connected to and communicate with the storage device using a network such as iWarp, ROCE, Infiniband, an FC, or Omni-Path.

The data processing unit in the storage device may be implemented by a network adapter, a separate FPGA chip, or a CPU in the storage device. The buffer unit in the storage device may be implemented by a network adapter memory, a storage unit in the FPGA chip, the buffer unit in the storage device, or a memory of the CPU in the storage device. Alternatively, the buffer unit in the storage device may be implemented by a buffer resource pool including at least two of a network adapter memory, a storage unit in the FPGA chip, the buffer unit in the storage device, or a memory of the CPU in the storage device.

Optionally, the control device may be a physical server or a virtual machine in a physical server. The storage unit in the storage device may be one or more solid state disks (SSD) or a hard disk drive (HDD). The buffer unit may be located in the data processing unit, or may be a storage medium independent of the data processing unit, for example, may be a double data rate (DDR) independent of the data processing unit. Alternatively, the buffer unit may be a memory resource pool including memory resources of plurality data processing units in the storage device.

In a possible design, the establishing, by the data processing unit, a correspondence between the at least two storage spaces and command queues includes:

establishing, by the data processing unit, the correspondence between the at least two storage spaces and the command queues according to correspondence information carried in the control command, where the correspondence information is a correspondence between at least two storage spaces of the buffer unit and command queues; or establishing, by the data processing unit, the correspondence between the at least two storage spaces and the command queues according to the at least two storage spaces obtained through division.

In a possible design, the control device is configured to obtain, within a preset time, an occupation proportion of the storage space that is of the buffer unit and that is corresponding to the first command queue and an occupation proportion of a storage space that is of the buffer unit and that is corresponding to a second command queue; and when the occupation proportion of the storage space that is of the buffer unit and that is corresponding to the first command queue is greater than a preset first threshold, and the occupation proportion of the storage space that is of the buffer unit and that is corresponding to the second command queue is less than a preset second threshold, the control device sends an adjustment command to the data processing unit, where the adjustment command is used for reducing the storage space that is of the buffer unit and that is corresponding to the second command queue, and allocating the reduced storage space that is of the buffer unit and that is corresponding to the second command queue to the storage space that is of the buffer unit and that is corresponding to the first command queue, where the first threshold is greater than the second threshold.

In a possible design, the data processing unit is further configured to: obtain, within a preset time, an occupation proportion of the storage space that is of the buffer unit and that is corresponding to the first command queue and an occupation proportion of a storage space that is of the buffer unit and that is corresponding to a second command queue; and when the occupation proportion of the storage space that is of the buffer unit and that is corresponding to the first command queue is greater than a preset first threshold, and the occupation proportion of the storage space that is of the buffer unit and that is corresponding to the second command queue is less than a preset second threshold, reduce the storage space that is of the buffer unit and that is corresponding to the second command queue, and allocate the reduced storage space that is of the buffer unit and that is corresponding to the second command queue to the storage space that is of the buffer unit and that is corresponding to the first command queue, where the first threshold is greater than the second threshold.

Storage spaces of the buffer unit that are to be allocated to different command queues are adjusted, such that the storage space of the buffer unit can be flexibly allocated according to an actual situation. Therefore, resources of the buffer unit can be maximally used, a problem of a large amount of data to be transmitted according to data read/write commands in some command queues can be resolved, and a service processing capability is improved while a resource waste is avoided.

Optionally, the data processing unit may establish a correspondence between each storage space of the buffer unit and a command queue according to the control command. The correspondence may be: One command queue is corresponding to one storage space, or a queue group including at least two command queues is corresponding to one storage space. In this way, the buffer unit can be allocated more flexibly, so as to allocate storage resources of the buffer unit to different command queues.

Optionally, a manner of dividing, by the data processing unit, the storage space of the buffer unit according to the control command from the control device includes but is not limited to: dividing the storage space according to a size of the storage space of the buffer unit, dividing the storage space according to quality of service of different command queues, or dividing the storage space according to priorities of different command queues.

Optionally, the data processing unit may further bind, according to the control command from the control device, plurality command queues together to form a queue group. A storage space that is of the buffer unit and that is corresponding to the command queue group is a sum of storage spaces corresponding to all the command queues in the queue group. In this way, the storage space of the buffer unit can be further configured more flexibly, so as to meet different requirements of different command queues for storage spaces of the buffer unit.

In a possible design, the control device is further configured to: obtain an available storage space that is of the buffer unit and that is corresponding to the first command queue, and determine whether a storage space occupied by first data to be transmitted according to the first data read/write command is less than or equal to the available storage space that is of the buffer unit and that is corresponding to the first command queue;

the control device is further configured to: send the first data read/write command to the storage device when the storage space occupied by the first data is less than or equal to the available storage space that is of the buffer unit and that is corresponding to the first command queue; or suspend sending of the first data read/write command when the storage space occupied by the first data is greater than the available storage space that is of the buffer unit and that is corresponding to the first command queue; and the data processing unit is further configured to: receive the first data read/write command sent by the control device, and buffer, in the buffer unit corresponding to the first command queue, the data to be transmitted according to the first data read/write command.

In this way, the control device sends the first data read/write command in the first command queue only when data that needs to be transmitted can be buffered in the storage space that is of the buffer unit and that is corresponding to the first command queue. Therefore, a problem of a complex processing mechanism caused by buffering a command in the first command queue when an available storage space in the storage space that is of the buffer unit and that is corresponding to the first command queue is insufficient can be avoided.

In a possible design, the obtaining, by the control device, an available storage space that is of the buffer unit and that is corresponding to the first command queue includes:

before sending the first data read/write command to the storage device, sending, by the control device to the data processing unit, a request for obtaining the available storage space that is of the buffer unit and that is corresponding to the first command queue, so as to obtain the available storage space that is of the buffer unit and that is corresponding to the first command queue.

In a possible design, before sending, to the data processing unit, a request for obtaining the available storage space that is of the buffer unit and that is corresponding to the first command queue, the control device is further configured to send a second data read/write command to the storage device, where data to be transmitted according to the second data read/write command is greater than the available storage space that is of the buffer unit and that is corresponding to the first command queue; and the control device receives a backpressure message sent by the data processing unit, where the backpressure message is used to indicate insufficiency of the available storage space that is of the buffer unit and that is corresponding to the first command queue.

In the foregoing manner, the control device may not need to send, each time of sending a data read/write command, a request for obtaining an available storage space in a storage space that is of the buffer unit and that is corresponding to a command queue to which the to-be-sent command belongs, but send the foregoing obtaining request only after receiving a backpressure message returned by the data processing unit for indicating that data cannot be buffered. In this way, resource consumption of the control device can be reduced, and resource consumption generated when the data processing unit returns the backpressure message can also be accordingly reduced.

In a possible design, the control device is further configured to: after sending of the first data read/write command has been suspended for a preset time, re-obtain the available storage space that is of the buffer unit and that is corresponding to the first command queue, and send the first data read/write command to the storage device when the storage space occupied by the first data is less than or equal to the available storage space that is of the buffer unit and that is corresponding to the first command queue.

Optionally, the preset time for which sending of the first data read/write command has been suspended by the control device may be a default time in a system or a preconfigured time. In addition, the preset time for which sending of the first data read/write command has been suspended by the control device may be flexibly set according to a specific service status.

Further, after receiving a backpressure packet sent by the memory, the control device further re-transmits the second data read/write command. That is, for the second data read/write command that cannot be executed in time because the storage space that is of the buffer unit and that is corresponding to the first command queue is insufficient, the control device resends the second data read/write command when the control device determines that the storage space that is of the buffer unit and that is corresponding to the first command queue is greater than the data to be transmitted according to the second data read/write command.

In a possible design, only within a preset time, the control device obtains the available storage space that is of the buffer unit and that is corresponding to the first command queue, and determines whether the storage space occupied by the first data to be transmitted according to the first data read/write command is less than or equal to the available storage space that is of the buffer unit and that is corresponding to the first command queue. That is, after a preset time within which the control device performs the Step of obtaining an available storage space of the buffer unit before sending the first data read/write command expires, and when the available storage space of the buffer unit is large enough, the Step of obtaining an available storage space of the buffer unit before sending the first data read/write command may not be performed any longer. In this way, both resource usage of the control device and resource usage of the data processing unit can be further improved. The preset time may be set differently according to different service scenarios. Within the preset time, the available storage space of the buffer unit cannot meet storage space requirements of data to be transmitted according to all data read/write commands sent by the control device. After the preset time expires, the available storage space of the buffer unit can meet a storage space requirement of data to be transmitted according to a data read/write command sent by the control device.

In a possible design, the available storage space of the buffer unit is a locally recorded real-time available storage space that is of the buffer unit and that is corresponding to the first command queue.

The "locally recorded" means that the available storage space is recorded in the control device, and the locally recorded real-time available storage space of the buffer unit is a real-time available storage space that is of the buffer unit and that is recorded in the control device.

Optionally, the control device may obtain and record the available storage space of the buffer unit when the storage device is powered on and initialized. Alternatively, the control device may obtain and record the available storage space of the buffer unit at any time after the storage device is powered on and initialized.

Optionally, a form of the real-time available storage space that is of the network adapter memory and that is recorded in the control device may be a size of a space that is of the buffer unit and that can store data or a quantity of data blocks that can be written.

Optionally, the control device stores, in a dedicated storage space such as a dedicated chip, the real-time available storage space in the storage space that is of the buffer unit and that is corresponding to the first command queue. Alternatively, the real-time available storage space in the storage space that is of the buffer unit and that is corresponding to the first command queue may be stored in an existing storage component of the control device, for example, a cache of a CPU of the control device, or a cache of the network adapter of the control device, or may be stored in a storage space of a separate FPGA chip.

The control device sends the first data read/write command when the data to be transmitted according to the first data read/write command can be buffered in the storage space that is of the buffer unit and that is corresponding to the first command queue. Therefore, a problem of a complex processing mechanism caused by buffering a command in the first command queue when the storage space that is of the buffer unit and that is corresponding to the first command queue is insufficient can be avoided.

In a possible design, the control device is further configured to: after sending the first data read/write command, subtract the storage space occupied by the first data from the locally recorded real-time available storage space that is of the buffer unit and that is corresponding to the first command queue, and after receiving a response message that is sent by the data processing unit and indicates completion of the first data read/write command, add the storage space occupied by the first data and the locally recorded real-time available storage space that is of the buffer unit and that is corresponding to the first command queue.

After the control device sends the first data read/write command, the data to be transmitted according to the first data read/write command occupies the storage space that is of the buffer unit and that is corresponding to the first command queue. Therefore, the storage space occupied by the first data needs to be subtracted from the recorded real-time available storage space that is of the buffer unit and that is corresponding to the first command queue. After the control device receives the response message that is sent by the data processing unit and indicates completion of the first data read/write command, the first data has been migrated out from the buffer unit corresponding to the first command queue. Therefore, the storage space occupied by the first data and the recorded real-time available storage space that is of the buffer unit and that is corresponding to the first command queue need to be added. In this way, a latest available storage space that is of the buffer unit and that is corresponding to the first command queue can be correctly recorded.

In a possible design, the control device is further configured to: after sending of the first data read/write command has been suspended for a preset time, re-determine whether the storage space occupied by the first data is less than or equal to the locally recorded real-time available storage space that is of the buffer unit and that is corresponding to the first command queue, and send the first data read/write command to the storage device when the storage space occupied by the first data is less than or equal to the locally recorded real-time available storage space that is of the buffer unit and that is corresponding to the first command queue.

Optionally, when the first data read/write command is a write command, the data to be transmitted according to the first data read/write command is to-be-stored data. The write command carries an SGL. The SGL includes a field, for example, the field may be an entry. The field includes information such as a source address that is of the to-be-stored data and that is in the control device, a length of the to-be-stored data, and a destination address that is of the to-be-stored data and that is in the storage device.

The data processing unit buffers, according to the source address that is of the to-be-stored data and in the control device and that is carried in the SGL in the write command, the to-be-stored data in the storage space that is of the buffer unit and that is corresponding to the first command queue. Optionally, the data processing unit may receive the to-be-stored data in an RDMA manner using the network adapter in the control device.

After the to-be-stored data is buffered in the storage space that is of the buffer unit and that is corresponding to the first command queue, the data processing unit modifies the write command, and modifies the source address that is of the to-be-stored data and in the control device and that is carried in the write command into an address that is in the buffer unit and that is used for storing the to-be-stored data, and sends the modified write command to a controller of a destination hard disk. That is, an SGL carried in the write command sent by the data processing unit to the controller of the destination hard disk includes information such as the address that is in the buffer unit and that is used for storing the to-be-stored data, the length of the to-be-stored data, and the destination address that is of the to-be-stored data and that is in the storage device.

After determining the destination hard disk, the data processing unit sends the modified write command to the controller of the destination hard disk. The controller of the destination hard disk reads the to-be-stored data from the buffer unit according to the address that is of the to-be-stored data and in the buffer unit and that is carried in the received write command, for example, reads the to-be-stored data in an RDMA manner or a DMA manner, and writes the read to-be-stored data into a storage space corresponding to the destination hard disk.

When the first data read/write command is a read command, the data to be transmitted according to the first data read/write command is to-be-read data. The read command carries an SGL. The SGL includes information such as a source address that is of the to-be-read data and that is in the storage device, a length of the to-be-read data, and a destination address that is in the control device and into which the to-be-read data is to be written.

After receiving the read command, the data processing unit modifies the read command, modifies the destination address that is of the to-be-read data and in the control device and that is carried in the read command into an address, used for buffering the to-be-read data, in the storage space that is of the buffer unit and that is corresponding to the first command queue, and sends the modified read command to a controller of a destination hard disk. That is, an SGL carried in the read command sent by the data processing unit to the controller of the destination hard disk includes information such as the source address that is of the to-be-read data and that is in the storage device, the length of the to-be-read data, and the address, used for buffering the to-be-read data, in the storage space that is of the buffer unit and that is corresponding to the first command queue. The controller of the destination hard disk migrates, according to the received and modified read command, the to-be-read data to the storage space that is of the buffer unit and that is corresponding to the first command queue. Optionally, the controller of the destination hard disk migrates, in an RDMA manner, the to-be-read data to the storage space that is of the buffer unit and that is corresponding to the first command queue.

After the to-be-read data is buffered in the storage space that is of the buffer unit and that is corresponding to the first command queue, the data processing unit sends the buffered to-be-read data to the control device according to the destination address, into which the to-be-read data is to be written, that is in the control device and that is in the read command. Optionally, the data processing unit sends the buffered to-be-read data to the control device in an RDMA manner.

In a possible design, the data processing unit is connected to the storage unit using an NVMe over Peripheral Component Interconnect Express PCIe, NVMe over PCIe, architecture.

In a possible design, the data processing unit includes a controller, the controller is configured to control transmission of data buffered in the buffer unit to the storage unit, and the controller is a physical controller or a non-volatile memory controller in the NVMe over fabric architecture.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the embodiments of the present disclosure with reference to the accompanying drawings.

In addition, the terms "first" and "second" in the embodiments of the present disclosure are merely used for a description purpose, and shall not be understood as an indication or implication of relative importance or implicit indication of a quantity of indicated technical features. Therefore, a feature limited by "first" or "second" may explicitly or implicitly include one or more features.

Figure 1:
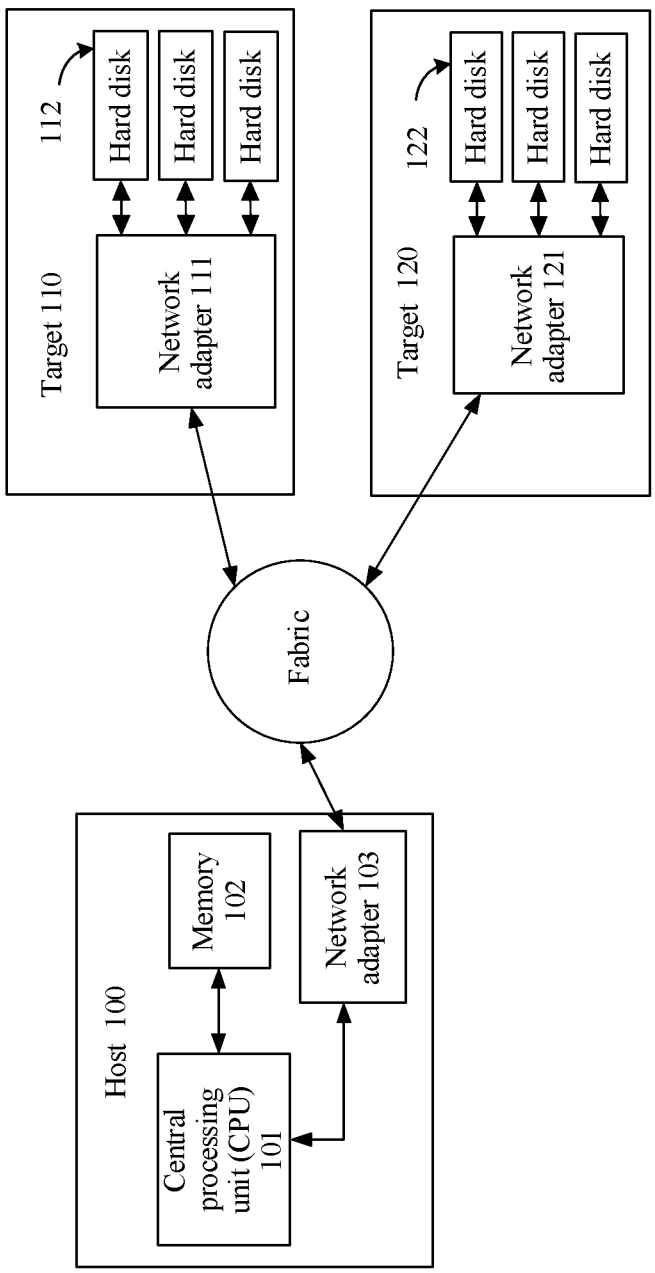
FIG. 1 is a schematic architectural diagram of an implementation in an NVMe over fabric architecture.

FIG. 1 is a schematic architectural diagram of an implementation in an NVMe over fabric architecture in the prior art. Referring to FIG. 1, FIG. 1 includes a host 100, a target 110, and a target 120. The host 100 is mainly responsible for initiating data reading/writing, for example, by sending a data read/write command. The target 110 and the target 120 are target storage devices, also referred to as NVM subsystems in an NVMe protocol, and are mainly responsible for receiving and executing a read/write command sent by the host 100. A specific form of the host 100 includes but is not limited to a physical server or a virtual machine in a physical server. As may be seen, host 100 includes a central processing unit 101, a memory 102 and network adapter 103. The physical server may be a computer device that includes components such as a CPU, a memory, and a network adapter as shown in FIG. 1. The target 110 may be a separate physical hard disk system. As shown in FIG. 1, the target 110 includes a network adapter 111 and at least one hard disk 112. The network adapter 111 is separately connected to the at least one hard disk 112. It should be noted that three hard disks 112 are used in FIG. 1. The hard disk(s) in the target 110 may be a storage medium with a storage function, such as an SSD or an HDD. The network adapter 111 has a network interface card function, and may be a remote network interface card (RNIC) in NVMe over fabric. The network adapter 111 performs, with the host 100 using a fabric network, communication related to a data read/write command or data transmission.

The target 120 has a structure similar to that of the target 110, and includes a network adapter 121 and at least one hard disk 122. Functions and implementations of components (the network adapter 121, the hard disk(s) 122, and the like) in the target 120 are similar to functions and implementations of components (the network adapter 111 and the hard disk 112) in the target 110. In a further implementation, there may additional targets 110 and 120. In FIG. 1, only two targets (the target 110 and the target 120) are shown as an example for description.

The host 100 may send plurality commands (for example, write commands or read commands) to the target 110 within a period of time. When plurality commands need to be sent, the host 100 sends these commands in a form of a queue, and a command that is first written into the queue is first executed. In addition, the host 100 may include plurality CPUs, or there are plurality threads in one CPU. The plurality CPUs or the plurality threads may process the plurality commands in parallel. Therefore, in the NVMe over fabric architecture, plurality queues may be used to process commands in parallel.

Usually, the network adapter 111 includes plurality queues, and each queue includes a command sent by the host 100. When there are plurality commands in the plurality queues, data to be read/written according to a command in a queue may occupy most of a storage space of a network adapter memory of the network adapter 111, and a command in another queue cannot be executed in time because no sufficient storage space of the network adapter memory can be obtained by means of application to buffer data that needs to be read/written.

A command that cannot be executed in time cannot apply for an available storage space again before another storage space of the network adapter memory of the network adapter 111 is released. Such an operation brings many complexities to a design and an implementation of the network adapter 111. For example, these complexities include at least one of the following:

(1) When the storage space of the network adapter memory of the network adapter 111 is less than a storage space occupied by to-be-transmitted data, the network adapter 111 needs to buffer a corresponding write command or read command.

(2) When the network adapter 111 fails to obtain, by means of application, an available storage space in a long time (for example, the network adapter memory of the network adapter 111 has no available storage space in a long time), a mechanism needs to be designed to age (for example, delete) a write command or a read command that is buffered for a long time.

(3) After a write command or a read command that is buffered for a long time is aged, a mechanism is further required to notify the host 100 that the host 100 needs to resend a related command or related data.

To resolve the foregoing problem of a complex implementation mechanism, the embodiments of the present disclosure provide a method, device, and system for controlling a data read/write command in an NVMe over fabric architecture. To clearly describe the method for controlling a data read/write command in NVMe over fabric that is provided in the embodiments of the present disclosure, in an example for describing the embodiments of the present disclosure, a host is connected to one target to transfer data. A case in which a host is connected to plurality targets to transfer data may be implemented with reference to a case in which a host is connected to one target, and details are not described.

It should be noted that, in a further implementation, a target that is used as a storage device may receive, using a network adapter, a separate field programmable gate array (FPGA) chip, or a CPU in the target, a data read/write command sent by a host that is used as a control device. In the embodiments of the present disclosure, the network adapter, the FPGA chip, or the CPU that is in the storage device and that receives the data read/write command sent by the control device is collectively referred to as a data processing unit. It may be understood that the data processing unit in the embodiments of the present disclosure may be a unit or an entity that has a same function as the network adapter, the FPGA chip, or the CPU. Any unit or entity that can receive and process a data read/write command sent by the host used as the control device can be used as the data processing unit in the storage device in the embodiments of the present disclosure.

When the network adapter is used as the data processing unit in the storage device, a network adapter memory is configured to buffer data to be transmitted according to a data read/write command received by the network adapter. When the FPGA is used as the data processing unit in the storage device, a storage unit in the FPGA is configured to buffer data to be transmitted according to a data read/write command received by the FGPA. When the CPU in the storage device is used as the data processing unit in the storage device, a memory of the CPU is configured to buffer data to be transmitted according to a data read/write command received by the CPU, that is, the data is buffered by sharing the memory of the CPU. In addition, the buffer unit in the target, for example, a buffer device in which a DDR is used as a cache may also be used as a cache of the network adapter, the FPGA, or the CPU. In the embodiments of the present disclosure, the network adapter memory, the storage unit in the FPGA chip, the memory of the CPU, or the buffer unit in the target is collectively referred to as a buffer unit. It may be understood that the buffer unit in the embodiments of the present disclosure may be another storage medium that has a same function as the network adapter memory, the storage unit in the FPGA chip, or the memory of the CPU. Any storage medium that can be used to buffer data to be transmitted according to a data read/write command sent by the host used as the control device can be used as the buffer unit in the storage device in the embodiments of the present disclosure. In addition, the network adapter memory, the storage unit in the FPGA chip, the memory of the CPU, and the buffer unit in the target may form a buffer resource pool. In a further implementation, one or more of the network adapter, the FPGA chip, or the CPU may receive a data read/write command sent by the host, and buffer, in the buffer resource pool, data that needs to be transmitted.

In the following example for describing the embodiments of the present disclosure, a network adapter is used as a data processing unit in a storage device, a network adapter memory is used as a buffer unit in the storage device, a target is used as the storage device, and a host is used as a control device. It may be understood that for an implementation of using an FPGA or a CPU as the data processing unit, refer to an implementation of using the network adapter as the data processing unit. For an implementation of using a storage unit in the FPGA chip, a buffer unit in the target, or a memory of the CPU as the buffer unit or an implementation of a resource pool including a storage unit in the FPGA chip, a buffer unit in the target, and a memory of the CPU, refer to an implementation of using the network adapter memory as the buffer unit, and details are not described.

Figure 2:
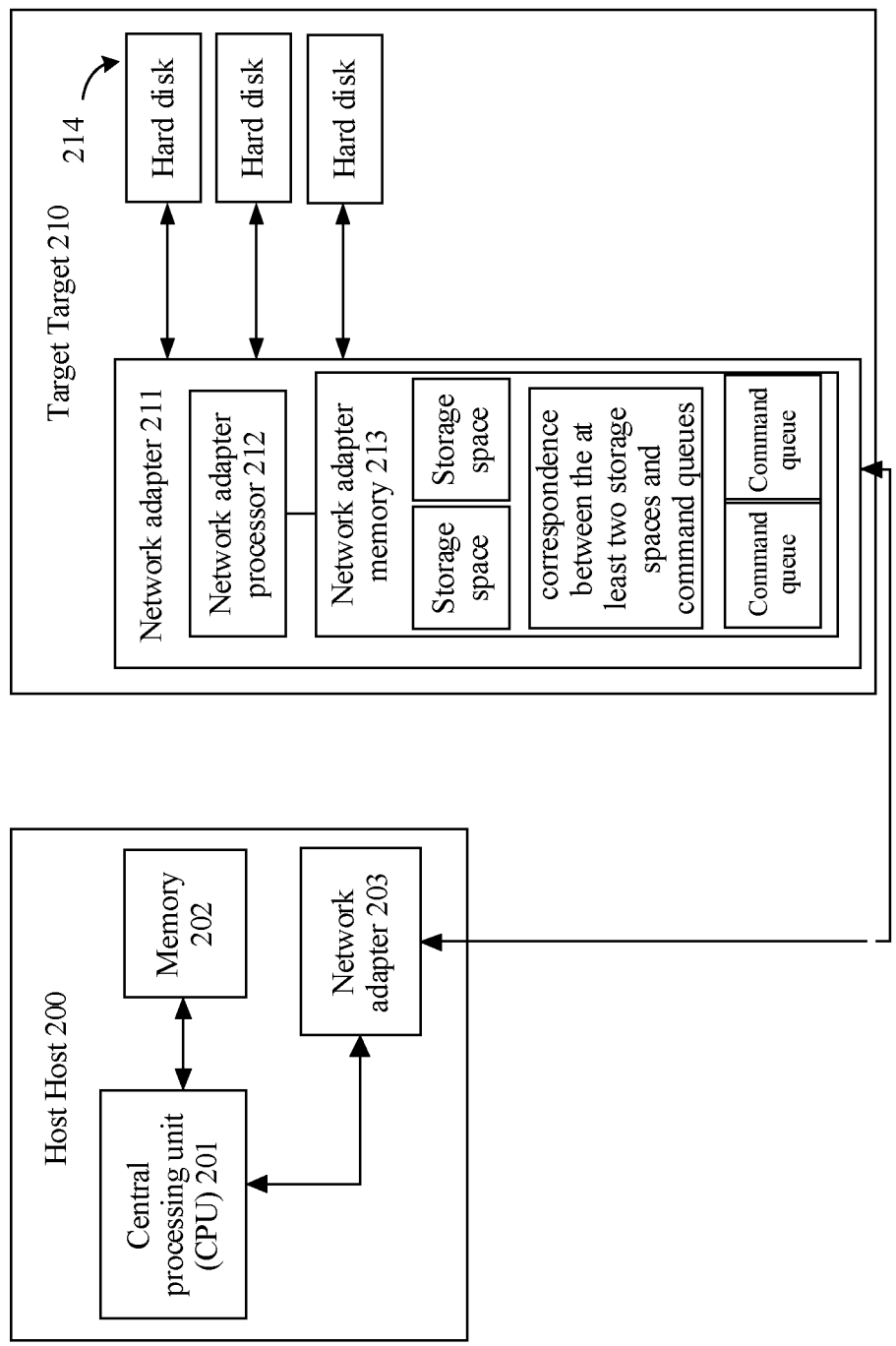
FIG. 2 is a schematic structural diagram of a system for controlling a data read/write command in an NVMe over fabric architecture according to an embodiment of the present disclosure.
Figure 3A:
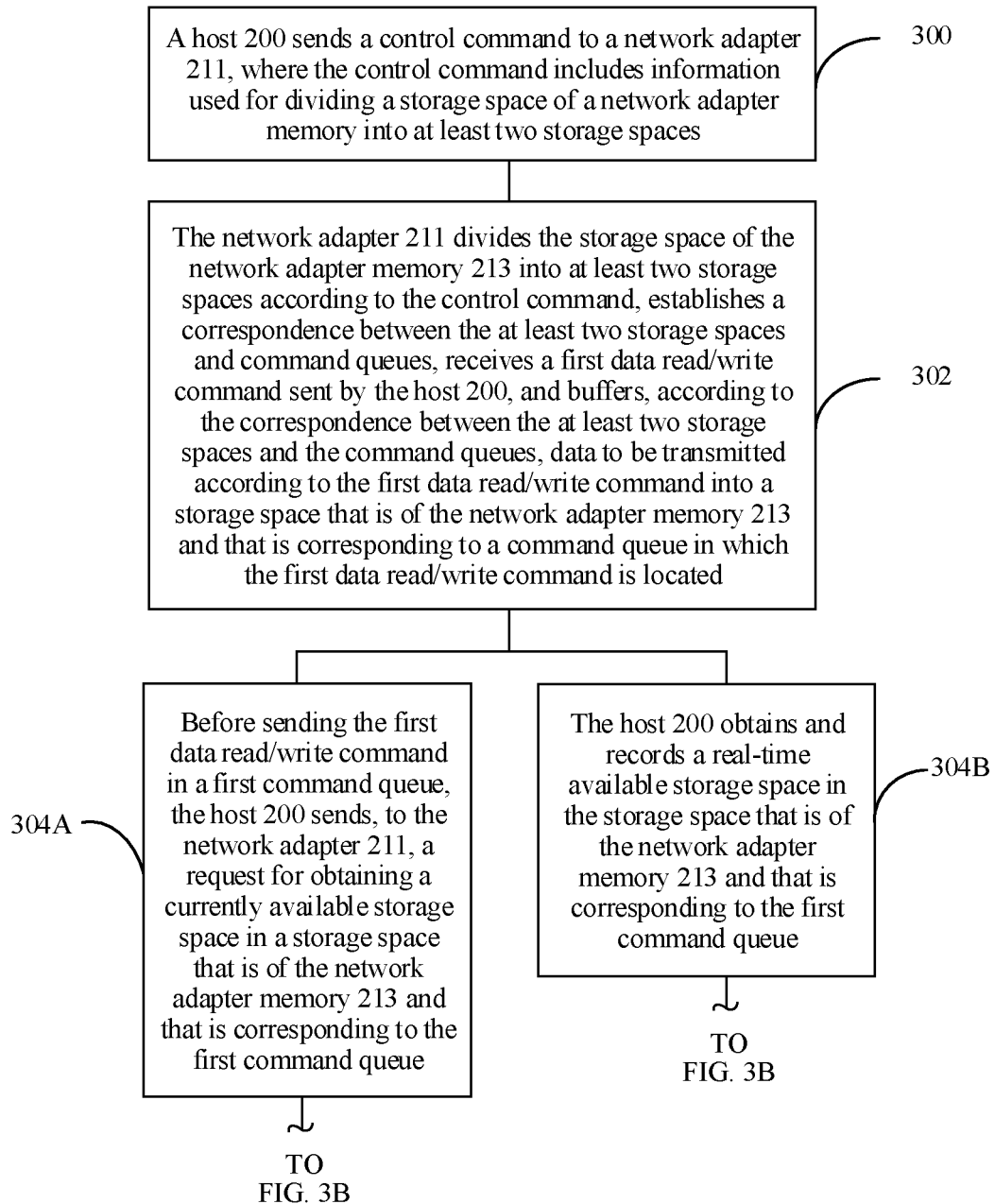
FIG. 3A, FIG. 3B, FIG. 3C, and FIG. 3D are a schematic flowchart of a method for controlling a data read/write command in an NVMe over fabric architecture according to an embodiment of the present disclosure.
Figure 3B:
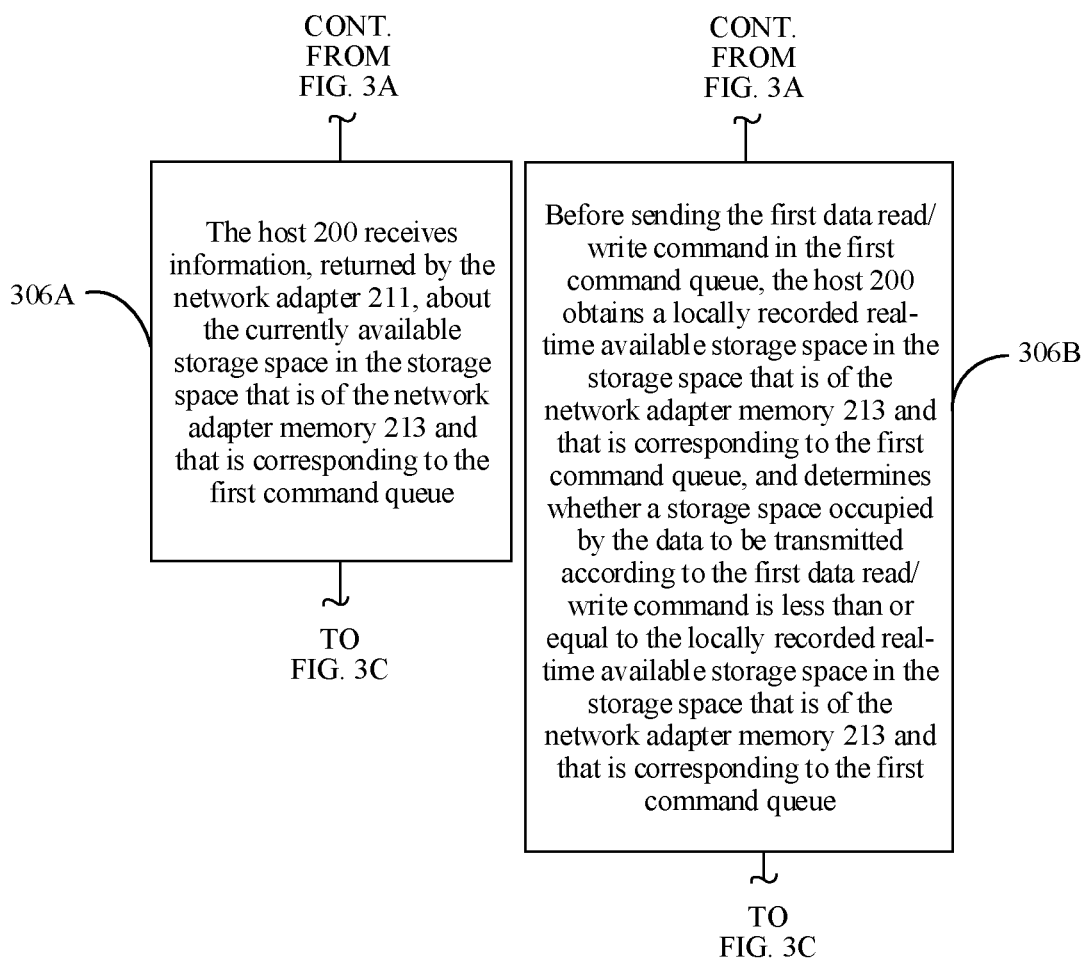
Figure 3C:
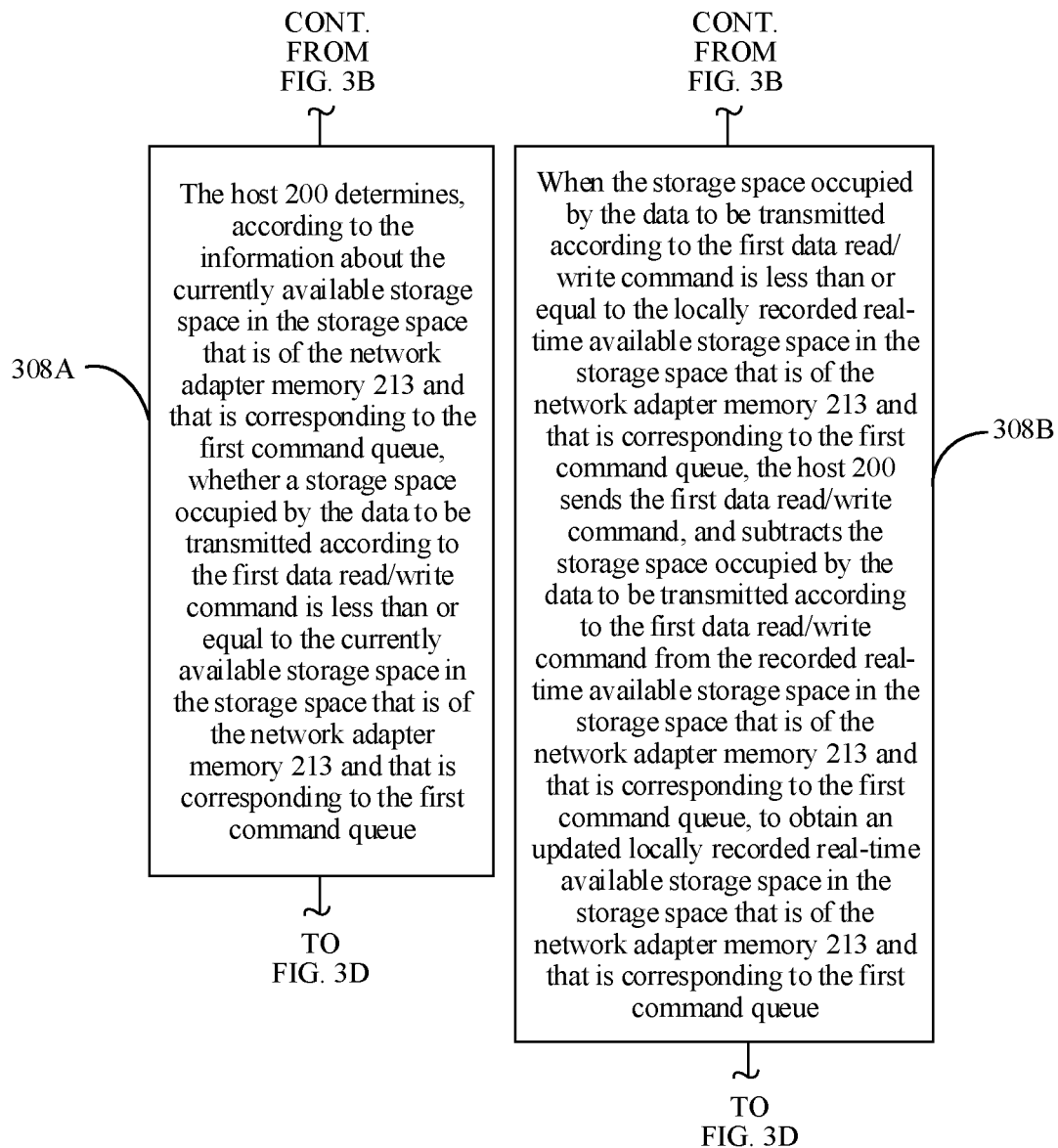
Figure 3D:
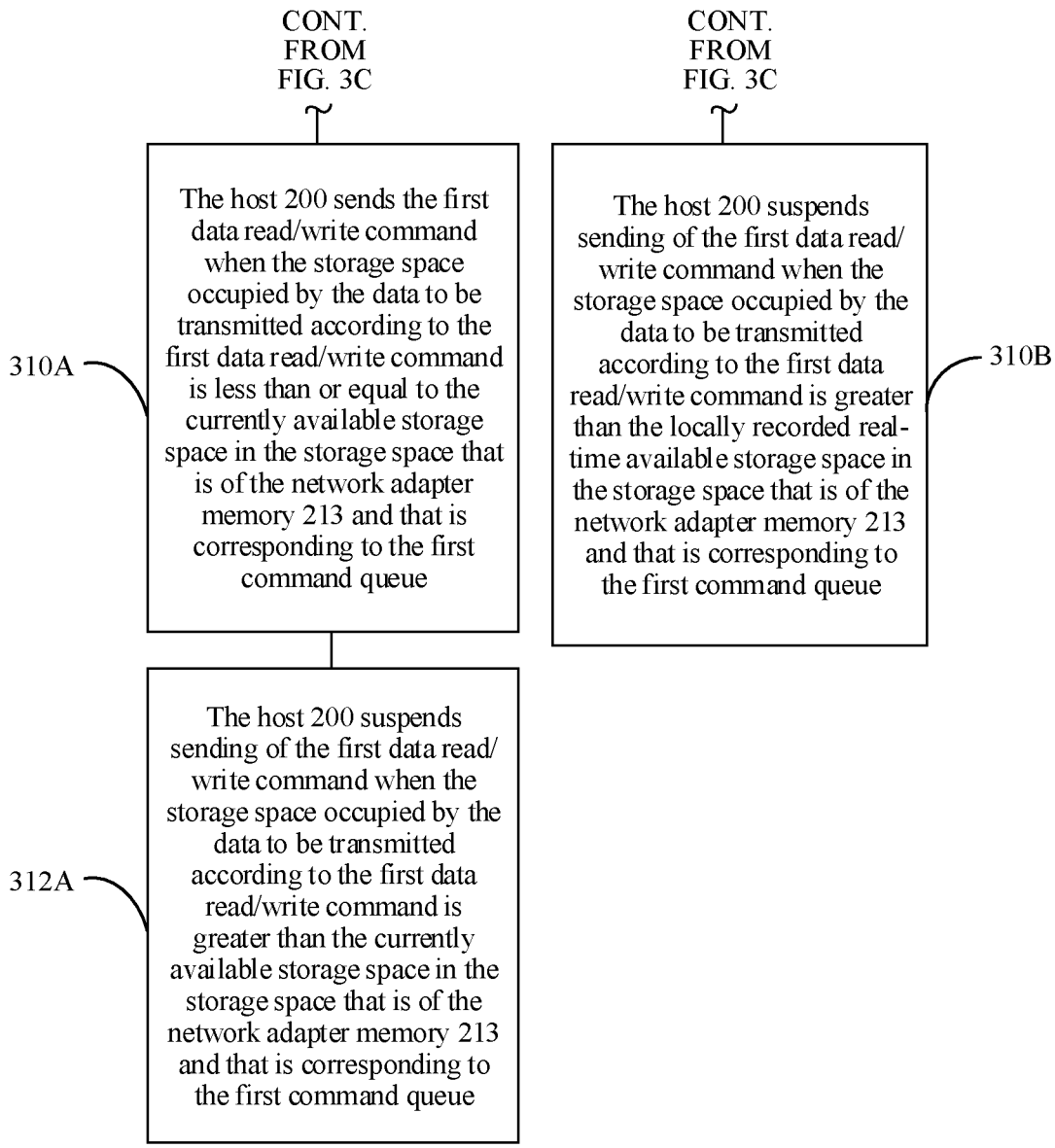

In the following, a method for controlling a data read/write command in NVMe over fabric according to an embodiment of the present disclosure is described using an architecture and a composition manner shown in FIG. 2 as an example. As shown in FIG. 2, a host 200 is connected to a target 210 using a fabric network. Further, the host 200 may be connected to and communicate with the target 210 using a network such as iWarp, ROCE, Infiniband, an FC, or Omni-Path.

The host 200 includes hardware components such as a CPU 201, a memory 202, and a network adapter 203. The target 210 includes a network adapter 211 and at least one hard disk 214. Network adapter 211 includes network adapter processor 212 and network adapter memory 213. The host 200 is a host and is mainly responsible for initiating data reading/writing, for example, sending a data read/write command to the target 210. A specific form of the host 200 includes but is not limited to a physical server or a virtual machine in a physical server. The physical server may be a computer device that includes components such as a CPU, a memory, and a network adapter. It should be noted that when the host 200 is a virtual machine in a physical server in one embodiment and includes the hardware components such as the CPU 201, the memory 202, and the network adapter 203. Host 200 may also comprise resources such as a CPU, a memory, and a network adapter that are allocated by the physical server to the virtual machine for use. Similarly, the network adapter 211 in the target 210 may be a virtual network adapter. The virtual network adapter is a network adapter resource that is allocated by a physical network adapter in the target 210 to the virtual network adapter for use.

The target 210 is a target storage device, also referred to as an NVM subsystem in NVMe, and is mainly responsible for receiving and executing a read/write command sent by the host 200. The hard disk in the target 210 may be a medium with a storage function, such as an SSD or an HDD. In FIG. 2, three hard disks 214 are used as an example for description. The network adapter 211 includes a network adapter processor 212 and a network adapter memory 213. The network adapter 211 has a network interface card function, and may be an RNIC in NVMe over fabric. The network adapter 211 performs, with the host 200 using a network in the NVMe over fabric architecture, communication related to a data read/write command or data transmission.

It should be noted that, in an example for description in FIG. 2, the network adapter memory 213 is located in the network adapter 211, that is, the network adapter 211 includes the network adapter memory 213. In a further implementation, the network adapter memory 213 may be located outside the network adapter 211. That is, the network adapter memory in the target 210 may be a storage medium independent of the network adapter 211. In this embodiment of the present disclosure, the storage medium independent of the network adapter 211 may be a storage medium such as a DDR. In another optional implementation, the network adapter memory 213 of the network adapter 211 may be a memory resource pool including memory resources of plurality network adapters in the target 210. A specific presentation form of the network adapter memory is not limited in this embodiment of the present disclosure.

According to the method for controlling a data read/write command in NVMe over fabric that is provided in this embodiment of the present disclosure, a network adapter memory 213 of a network adapter 211 in a target 210 is divided into different storage spaces, and a one-to-one correspondence between each storage space and a command queue in the network adapter 211 is established. Data to be transmitted according to a command in each command queue can be buffered only in a corresponding storage space of the network adapter memory. In this way, a problem that a command in a particular queue cannot be executed in time because a large quantity of storage spaces of the network adapter memory are occupied for executing a command in another queue can be avoided.

Further, as shown in FIG. 3A, FIG. 3B, FIG. 3C, and FIG. 3D, a method for controlling a data read/write command in an NVMe over fabric architecture that is provided in an embodiment of the present disclosure includes the following steps.

Step 300: A host 200 sends a control command to a network adapter 211, where the control command includes information used for dividing a storage space of network adapter memory 213 into at least two storage spaces.

As a controller of a target 210, the host 200 can send the control command to the target 210 using a network, so as to control target 210. The control command sent by the host 200 to the target 210 includes indication information used for dividing the storage space of the network adapter memory 213 into at least two storage spaces.

A correspondence between each storage space of the network adapter memory 213 and a command queue may be: One command queue is corresponding to one storage space, or a queue group including at least two command queues is corresponding to one storage space. It may be understood that the at least two storage spaces obtained through division are independent from each other, and any two storage spaces do not affect each other.

In this embodiment of the present disclosure, the command queue may be a command queue to which a command sent by a host belongs. Commands sent by different hosts are corresponding to different queues. Alternatively, the command queue may be a command queue to which commands sent by different CPUs or different threads belong. Commands sent by different CPUs are corresponding to different queues, or commands sent by different threads are corresponding to different queues, or the like.

Step 302: The network adapter 211 divides the storage space of the network adapter memory 213 into at least two storage spaces according to the control command, establishes a correspondence between the at least two storage spaces and command queues, receives a first data read/write command sent by the host 200, and buffers, according to the correspondence between the at least two storage spaces and the command queues, data to be transmitted according to the first data read/write command into a storage space that is of the network adapter memory 213 and that is corresponding to a command queue to which the first data read/write command belongs.

According to the method, different command queues are corresponding to different storage spaces of the network adapter memory. Because data to be transmitted according to a data read/write command sent by the host 200 is buffered in a storage space corresponding to a command queue to which the data read/write command belongs, storage spaces of the network adapter memory that are corresponding to different command queues do not interfere with each other. Therefore, a problem that a data read/write command in a particular command queue cannot be executed because a storage space of the network adapter memory is insufficient is avoided, where the storage space of the network adapter memory is insufficient because data to be transmitted according to a data read/write command in another command queue occupies a large quantity of storage spaces of the network adapter memory.

That the network adapter 211 establishes a correspondence between the at least two storage spaces and command queues may be: establishing, by the network adapter 211, the correspondence between the at least two storage spaces and the command queues according to information that is about a correspondence between at least two storage spaces and command queues and that is carried in the command sent by the host 200. Alternatively, that the network adapter 211 establishes a correspondence between the at least two storage spaces and command queues may be: establishing, by the network adapter 211, the correspondence between the at least two storage spaces and the command queues according to the at least two storage spaces obtained through division. Further, the network adapter 211 may establish the correspondence between the at least two storage spaces and the command queues according to a preset correspondence template. For example, in the template, a large corresponding storage space is set for a queue with a high priority, and a large storage space is set for a queue that has a high requirement for traffic. The network adapter 211 may establish the correspondence between the at least two storage spaces and the command queues according to a specific service implementation scenario and based on the preset template.

Optionally, for the dividing, by the host 200, the storage space of the network adapter memory 213 into plurality storage spaces in Step 300, there may be plurality implementations, including but not limited to the following manners.

In a manner 1, the host 200 divides the storage space of the network adapter memory 213 according to a storage space size. When the storage space of the network adapter memory 213 is divided according to the storage space size, all storage spaces may have a same size or different sizes. For example, if a total storage space of the network adapter memory 213 is 100 GB, when there are ten command queues, a size of a storage space that is of the network adapter memory 213 and that is obtained through division may be 10 GB, or a storage space corresponding to each of eight command queues is 10 GB, and storage spaces corresponding to the other two command queues are separately 15 GB and 5 GB.

In a manner 2, the host 200 allocates different storage spaces according to QoS of different command queues in the network adapter 211. That is, the host 200 allocates a large storage space to a command queue that has a high requirement for QoS, and allocates a small storage space to a command queue that has a low requirement for QoS. For example, if a total storage space of the network adapter memory 213 is 100 GB, when there are ten command queues and a command queue 1 has a higher requirement for QoS than a command queue 2, a size of a storage space allocated by the host 200 to the command queue 1 is 15 GB, and a size of a storage space allocated to the command queue 2 is 5 GB.

In a manner 3, the host 200 allocates different storage spaces according to priorities of different command queues. That is, the host 200 allocates a large storage space to a command queue that has a high requirement for a priority, and allocates a small storage space to a command queue that has a low requirement for a priority. For example, if a total storage space of the network adapter memory 213 is 100 GB, when there are ten command queues in a controller 402 and a priority of a command queue 1 is higher than a priority of a command queue 2, a size of a storage space allocated by the host 200 to the command queue 1 is 15 GB, and a size of a storage space allocated to the command queue 2 is 5 GB.

In an optional implementation, the host 200 may bind plurality command queues together to form a command queue group. A storage space that is of the network adapter memory 213 and that is corresponding to the command queue group is a sum of storage spaces corresponding to all the command queues in the queue group. In this way, the storage space of the network adapter memory 213 can be configured more flexibly, so as to meet different requirements of different command queues for the storage space of the network adapter memory 213.

In a further implementation, within a period of time, data to be transmitted according to data read/write commands executed in some command queues may occupy a relatively large quantity of storage spaces, and data to be transmitted according to data read/write commands in some other command queues may occupy a relatively small quantity of storage spaces. For example, a storage space corresponding to a command queue 1 is 10 GB, and a storage space corresponding to a command queue 2 is 12 GB. Within a period of time, a storage space of 8 GB is occupied for executing data to be buffered according to a data read/write command in the command queue 1, that is, 80% of the storage space that is of the network adapter memory 213 and that is corresponding to the command queue 1 is occupied. However, a storage space of 4.8 GB is occupied for executing data to be buffered according to a data read/write command in the command queue 2, that is, only 40% of the storage space that is of the network adapter memory 213 and that is corresponding to the command queue 2 is occupied. To make better use of a storage resource of the network adapter memory 213, the host 200 may perform temporary adjustment, to reduce the storage space that is of the network adapter memory 213 and that is corresponding to the command queue 2, and increase the storage space that is of the network adapter memory 213 and that is corresponding to the command queue 1. That is, a part of the storage space that is of the network adapter memory 213 and that is corresponding to the command queue 2 is allocated to the command queue 1. In this manner, the host 200 can opportunely adjust storage spaces of the network adapter memory that are allocated to different command queues, so as to more flexibly meet an actual service requirement.

Further, a CPU in the host 200 may obtain, within a preset time, an occupation proportion of the storage space that is of the network adapter memory 213 and that is corresponding to a first command queue and an occupation proportion of a storage space that is of the network adapter memory 213 and that is corresponding to a second command queue. When the occupation proportion of the storage space that is of the network adapter memory 213 and that is corresponding to the first command queue is greater than a preset first threshold (for example, 80%), and the occupation proportion of the storage space that is of the network adapter memory 213 and that is corresponding to the second command queue is less than a preset second threshold (for example, 30%), the CPU in the host 200 sends a command to the network adapter 211, so as to control the network adapter 211 to increase the storage space that is of the network adapter memory 213 and that is corresponding to the first command queue, and accordingly reduce the storage space that is of the network adapter memory 213 and that is corresponding to the second command queue. That is, the reduced storage space that is of the network adapter memory and that is corresponding to the second command queue is allocated to the storage space that is of the network adapter memory and that is corresponding to the first command queue. Optionally, the network adapter 211 may obtain occupation proportions of storage spaces corresponding to different command queues, and adjust, according to the obtained occupation proportions, the storage spaces corresponding to the different command queues. Details are not described.

Optionally, the host 200 may increase, according to a fixed proportion, the storage space that is of the network adapter memory 213 and that is corresponding to the first command queue, for example, sequentially increase the storage space by 10% of the corresponding storage space of the network adapter memory 213 within a fixed time, to increase a capacity of the storage space in three times. Alternatively, the storage space that is of the network adapter memory 213 and that is corresponding to the first command queue may be increased by a preset proportion in one time, for example, the storage space is increased by 30% of the corresponding storage space of the network adapter memory 213 in one time.

It should be noted that when the host 200 adjusts a capacity of a storage space that is of the network adapter memory 213 and that is corresponding to a command queue, the network adapter 211 suspends buffering of data in the network adapter memory 213, to avoid a failure in buffering the data in the network adapter memory 213.

The foregoing implementations are described using a network adapter memory as a buffer unit, and a network adapter as a data processing unit. In a further implementation, a network adapter memory and a memory of a CPU may be used as buffer units at the same time. In this case, the network adapter memory may be corresponding to some command queues, and the memory of the CPU may be corresponding to the other command queues. When different command queues have different priorities or different requirements for QoS, a storage space of the network adapter memory may be corresponding to a command queue that has a high priority or a high requirement for QoS, and a command queue corresponding to a low priority or a low requirement for QoS is allocated to a storage space of a memory of a CPU in a storage device. Data is quickly and efficiently buffered when the network adapter memory is used as the buffer unit. Therefore, when a command queue with a high priority is allocated to the storage space of the network adapter memory, a service requirement of a command with a high priority can be met.

It may be understood that, when the buffer unit includes a storage unit in an FPGA chip and the memory of the CPU in the storage device, the storage unit in the FPGA chip may be corresponding to a command queue that has a high priority or a high requirement for QoS, and a command queue corresponding to a low priority or a low requirement for QoS may be allocated to the storage space of the memory of the CPU in the storage device.

Further, for any one of plurality command queues, when the network adapter 211 buffers data to be transmitted according to a data read/write command in the command queue, a storage space that is of the network adapter memory 213 and that is corresponding to the command queue may be insufficient. Consequently, a problem of a complex processing mechanism is caused when the data read/write command in the command queue cannot be executed in time because no sufficient storage space of the network adapter memory 213 can be obtained by means of application.

To further improve technical effects of the technical solution provided in this embodiment of the present disclosure, based on Step 300 and Step 302, three possible implementations are further provided in this embodiment of the present disclosure, so as to resolve a problem of a complex processing mechanism caused when a command in any one of plurality command queues cannot be executed because a storage space that is of the network adapter memory and that is corresponding to the command queue is insufficient. It should be noted that the three possible implementations separately described in the following are equivalent implementations. In this embodiment of the present disclosure, a description manner of providing descriptions using "first", "second", and "third" is merely for clearly describing the three implementations, and does not represent a sequence or preference of the three implementations. In addition, the first command queue described in this embodiment of the present disclosure is any one of command queues, and the first data read/write command described in this embodiment of the present disclosure is any first data read/write command.

First Possible Implementation

After Step 302, as shown in FIG. 3A, FIG. 3B, FIG. 3C, and FIG. 3D, the method provided in this embodiment of the present disclosure further includes the following steps.

Step 304A: Before sending the first data read/write command in a first command queue, the host 200 sends, to the network adapter 211, a request for obtaining an available storage space in a storage space that is of the network adapter memory 213 and that is corresponding to the first command queue.

The available storage space in the storage space that is of the network adapter memory 213 and that is corresponding to the first command queue is a storage space that is currently not occupied, when the network adapter 211 receives the request sent by the host 200, in the storage space that is of the network adapter memory 213 and that is corresponding to the first command queue.

The host 200 may send, by sending a request message, the request for obtaining the available storage space in the storage space that is of the network adapter memory 213 and that is corresponding to the first command queue to the network adapter 211. The request message carries a request for requesting the network adapter 211 to return the available storage space in the storage space that is of the network adapter memory 213 and that is corresponding to the first command queue. For example, the request message may be a request packet. The request packet includes a field for obtaining the available storage space of the network adapter memory 213. In this embodiment of the present disclosure, neither a form of the request message nor a form of information that is carried in the request message and that is used for instructing the network adapter 211 to return the available storage space of the network adapter memory 213 is limited. Alternatively, the host 200 may obtain information about the available storage space of the network adapter memory 213 by reading a register in which the information about the available storage space of the network adapter memory 213 is recorded.

Step 306A: The host 200 receives information, returned by the network adapter 211, about the available storage space in the storage space that is of the network adapter memory 213 and that is corresponding to the first command queue.

Further, after receiving the request sent by the host 200 for obtaining the available storage space in the storage space that is of the network adapter memory 213 and that is corresponding to the first command queue, the network adapter 211 may return the information about the available storage space in the storage space that is of the network adapter memory 213 and that is corresponding to the first command queue to the host 200 by adding the information to a response message. The host 200 obtains the information about the available storage space in the storage space that is of the network adapter memory 213 and that is corresponding to the first command queue from the response message.

The available storage space that is of the network adapter memory 213 and that is returned by the network adapter 211 is an available storage space of the network adapter memory 213 when the network adapter 211 receives the request sent by the host 200. Therefore, the available storage space that is of the network adapter memory 213 and that is returned by the network adapter 211 to the host 200 is a real-time available storage space of the network adapter memory 213.

Step 308A: The host 200 determines, according to the information about the available storage space in the storage space that is of the network adapter memory 213 and that is corresponding to the first command queue, whether a storage space occupied by the data to be transmitted according to the first data read/write command is less than or equal to the available storage space in the storage space that is of the network adapter memory 213 and that is corresponding to the first command queue.

For example, a size of the available storage space of the network adapter memory 213 is 100 MB, and the storage space occupied by the to-be-stored data is 50 MB. Whether the storage space occupied by the to-be-stored data is less than or equal to the available storage space of the network adapter memory 213 may be determined by determining that 50 MB is less than 100 MB. Alternatively, a length of the available storage space of the network adapter memory 213 is 50 data blocks, and the storage space occupied by the to-be-stored data is 60 data blocks. Whether the storage space occupied by the to-be-stored data is less than or equal to the available storage space of the network adapter memory 213 may be determined by determining that 60 data blocks are greater than 50 data blocks.

Step 310A: The host 200 sends the first data read/write command when the storage space occupied by the data to be transmitted according to the first data read/write command is less than or equal to the available storage space in the storage space that is of the network adapter memory 213 and that is corresponding to the first command queue.

Step 312A: The host 200 suspends sending of the first data read/write command when the storage space occupied by the data to be transmitted according to the first data read/write command is greater than the available storage space in the storage space that is of the network adapter memory 213 and that is corresponding to the first command queue.

In the accompanying drawing, Step 312A is under Step 310A. This is merely intended to clearly set the accompanying drawing, and does not represent that Step 312A and Step 310A are performed in a sequential order. In this embodiment of the present disclosure, Step 312A and Step 310A are parallel implementation steps.

In this way, the host 200 sends the first data read/write command in the first command queue only when the data that needs to be transmitted can be buffered in the storage space that is of the network adapter memory 213 and that is corresponding to the first command queue. Therefore, a problem of a complex processing mechanism caused by buffering a command in the first command queue when the available storage space in the storage space that is of the network adapter memory 213 and that is corresponding to the first command queue is insufficient can be avoided.

Optionally, after sending of the first data read/write command has been suspended for a preset time, the host 200 may resend the request for obtaining the available storage space in the storage space that is of the network adapter memory 213 and that is corresponding to the first command queue, and resend the first data read/write command when the storage space occupied by the data to be transmitted according to the first data read/write command is less than the available storage space in the storage space that is of the network adapter memory 213 and that is corresponding to the first command queue.

The preset time for which sending of the first data read/write command has been suspended by the host 200 may be a default time in a system or a preconfigured time. In a time range that is set by the preset time, the host 200 does not perform Step 304A. Further, the preset time for which sending of the first data read/write command has been suspended by the host 200 may be set by setting a timer in the host 200. After a time that is set in the timer expires, the host 200 restarts performing of Step 304A to Step 312A. It may be understood that the preset time for which sending of the first data read/write command has been suspended by the host 200 may be flexibly set according to a specific service status.

Second Possible Implementation

The second possible implementation provided in this embodiment of the present disclosure is a further improvement over the first possible implementation. In this implementation, the host 200 does not need to send, each time before sending a data read/write command in the first command queue, the request for obtaining the information about the available storage space in the storage space that is of the network adapter memory 213 and that is corresponding to the first command queue, but starts the procedure of Step 304A to Step 312A only after receiving a backpressure packet sent by the network adapter 211 for indicating that data to be transmitted according to the data read/write command in the first command queue cannot be buffered.

In a further implementation, when a currently available storage space in the storage space that is of the network adapter memory 213 and that is corresponding to the first command queue is large enough, and a relatively large amount of data can be buffered, the host 200 may not need to send, each time before sending a command, the request for obtaining the available storage space, but starts the procedure of Step 304A to Step 312A only after receiving the backpressure packet sent by the network adapter 211. In this way, a technical problem can be effectively resolved, efficiency of sending a command by the host 200 can be further improved, and a resource occupied by the host 200 for sending the request for obtaining the available storage space of the network adapter memory 213 can be reduced. Similarly, because does not need to return the information about the available storage space each time the network adapter 211 receives a request command sent by the host 200, a resource occupied by the network adapter 211 is also accordingly reduced.

Further, before Step 304A, the method further includes: sending, by the host 200, a second data read/write command in the first command queue. Before sending the second data read/write command, the host 200 does not need to obtain the information about the available storage space in the storage space that is of the network adapter memory 213 and that is corresponding to the first command queue. If data to be transmitted according to the second data read/write command is greater than the available storage space in the storage space that is of the network adapter memory 213 and that is corresponding to the first command queue, the network adapter 211 generates a backpressure packet and sends the backpressure packet to the host 200. The backpressure packet indicates that the data to be transmitted according to the second data read/write command sent by the host 200 cannot be buffered in the available storage space in the storage space that is of the network adapter memory 213 and that is corresponding to the first command queue.

After receiving the backpressure packet sent by the network adapter 211, and before sending another data read/write command (for example, the first data read/write command) in the first command queue, the host 200 first obtains the information about the available storage space in the storage space that is of the network adapter memory 213 and that is corresponding to the first command queue, and sends the another data read/write command (for example, the first data read/write command) only after determining that data to be transmitted according to the another data read/write command (for example, the first data read/write command) in the first command queue can be buffered in the available storage space in the storage space that is of the network adapter memory 213 and that is corresponding to the first command queue. That is, the host 200 performs the procedure of Step 304A to Step 312A after receiving the backpressure packet sent by the network adapter 211.

Further, after a preset time within which the procedure of Step 304A to Step 312A is performed expires, the procedure of Step 304A to Step 312A may not need to be performed again when the available storage space in the storage space that is of the network adapter memory 213 and that is corresponding to the first command queue is restored and has enough space for buffering data. That is, after the preset time within which the procedure of Step 304A to Step 312A is performed expires, when a data read/write command in the first command queue needs to be sent, the host 200 directly sends the data read/write command to the network adapter 211.

In this embodiment of the present disclosure, the preset time used for performing the procedure of Step 304A to Step 312A may be further set according to a requirement, may be a default time in a system, or may be a time that is set based on a time pre-delivered by an administrator. In addition, the preset time used for performing the procedure of Step 304A to Step 312A may be changed in real time according to an actual service status. For example, when the occupation proportion of the storage space that is of the network adapter memory 213 and that is corresponding to the first command queue is relatively large, the preset time used for performing the procedure of Step 304A to Step 312A is long. When the occupation proportion of the storage space that is of the network adapter memory 213 and that is corresponding to the first command queue is relatively small, the preset time used for performing the procedure of Step 304A to Step 312A is short.

In the foregoing embodiment, a backpressure message sent by the network adapter 211 to the host 200 may be a directly generated message or packet, or may be a message or a packet carried in a response message. For example, the backpressure message may be a message or a packet that is directly generated when the storage space that is of the network adapter memory 213 and that is corresponding to the first command queue is insufficient, or may be information that is carried in a command response message returned by the network adapter 211 to the host 200 and that indicates insufficiency of the storage space that is of the network adapter memory 213 and that is corresponding to the first command queue. A message or a packet of another type can be used as the backpressure packet sent by the network adapter 211 to the host 200, provided that the message or the packet can carry a message indicating insufficiency of the available storage space in the storage space that is of the network adapter memory 213 and that is corresponding to the first command queue and indicating that data to be transmitted according to a data read/write command, sent by the host 200, in the first command queue cannot be buffered. Optionally, information that is carried in the backpressure message and that indicates that the available storage space in the storage space that is of the network adapter memory 213 and that is corresponding to the first command queue is insufficient and cannot store to-be-stored data of the host 200 may be an error code, a preset identifier, or the like.

Further, after receiving the backpressure message sent by the network adapter 211, in a process of performing Step 304A to Step 312A, the host 200 further retransmits the second data read/write command. That is, for the second data read/write command that cannot be executed in time because the storage space that is of the network adapter memory 213 and that is corresponding to the first command queue is insufficient, the host 200 resends the second data read/write command when the host 200 determines that the storage space that is of the network adapter memory 213 and that is corresponding to the first command queue is greater than the data to be transmitted according to the second data read/write command.

Third Possible Implementation

In this implementation, the host 200 obtains and records a real-time available storage space in a storage space that is of the network adapter memory 213 and that is corresponding to a first command queue. Each time of sending the first data read/write command in the first command queue, the host 200 first determines whether the recorded real-time available storage space in the storage space that is of the network adapter memory 213 and that is corresponding to the first command queue is greater than or equal to a storage space occupied by the data to be transmitted according to the first data read/write command. The host 200 sends the first data read/write command when the recorded real-time available storage space in the storage space that is of the network adapter memory 213 and that is corresponding to the first command queue is greater than or equal to the storage space occupied by the data to be transmitted according to the first data read/write command. The host 200 suspends sending of the first data read/write command when the recorded real-time available storage space in the storage space that is of the network adapter memory 213 and that is corresponding to the first command queue is less than the storage space occupied by the data to be transmitted according to the first data read/write command.

The host 200 sends the first data read/write command when the data to be transmitted according to the first data read/write command can be buffered in the storage space that is of the network adapter memory 213 and that is corresponding to the first command queue. Therefore, a problem of a complex processing mechanism caused by buffering a command in the first command queue when the storage space that is of the network adapter memory 213 and that is corresponding to the first command queue is insufficient can be avoided.

Further, as shown in FIG. 3A, FIG. 3B, FIG. 3C, and FIG. 3D, after Step 302, the method provided in this embodiment of the present disclosure further includes the following steps.

Step 304B: The host 200 obtains and records a real-time available storage space in the storage space that is of the network adapter memory 213 and that is corresponding to the first command queue.

The host 200 may locally record the obtained available storage space of the network adapter memory 213, that is, record the obtained available storage space of the network adapter memory 213 in the host 200.

Further, when the target 210 is powered on and initialized, the host 200 may obtain an available storage space in the storage space that is of the network adapter memory 213 and that is corresponding to the first command queue, and use the available storage space as the real-time available storage space in the storage space that is of the network adapter memory 213 and that is corresponding to the first command queue. Because no data is buffered in the network adapter memory 213 when the target 210 is powered on and initialized, the obtained available storage space in the storage space that is of the network adapter memory 213 and that is corresponding to the first command queue is a total storage space in the storage space that is of the network adapter memory 213 and that is corresponding to the first command queue. When the total storage space is used as the recorded real-time available storage space in the storage space that is of the network adapter memory 213 and that is corresponding to the first command queue, the storage space that is of the network adapter memory 213 and that is corresponding to the first command queue can be maximally used.

Optionally, the host 200 may obtain, at any time after the target 210 is powered on and initialized, the available storage space in the storage space that is of the network adapter memory 213 and that is corresponding to the first command queue, and use the available storage space as the real-time available storage space in the storage space that is of the network adapter memory 213 and that is corresponding to the first command queue. In this case, because data is buffered, the obtained available storage space in the storage space that is of the network adapter memory 213 and that is corresponding to the first command queue is less than a total storage space in the storage space that is of the network adapter memory 213 and that is corresponding to the first command queue.

Step 306B: Before sending the first data read/write command in the first command queue, the host 200 obtains a locally recorded real-time available storage space in the storage space that is of the network adapter memory 213 and that is corresponding to the first command queue, and determines whether a storage space occupied by the data to be transmitted according to the first data read/write command is less than or equal to the locally recorded real-time available storage space in the storage space that is of the network adapter memory 213 and that is corresponding to the first command queue.

The locally recorded real-time available storage space in the storage space that is of the network adapter memory 213 and that is corresponding to the first command queue is the real-time available storage space, recorded in the host 200, in the storage space that is of the network adapter memory 213 and that is corresponding to the first command queue.

Further, the real-time available storage space, recorded in the host 200, in the storage space that is of the network adapter memory 213 and that is corresponding to the first command queue may be a size of a space that can store data. Correspondingly, the storage space occupied by the data to be transmitted according to the first data read/write command may be a size of the storage space occupied by the data to be transmitted according to the first data read/write command. Whether the storage space occupied by the data to be transmitted according to the first data read/write command is less than or equal to the recorded real-time available storage space in the storage space that is of the network adapter memory 213 and that is corresponding to the first command queue may be determined by determining whether the size of the storage space occupied by the data to be transmitted according to the first data read/write command is less than or equal to a size of the recorded real-time available storage space in the storage space that is of the network adapter memory 213 and that is corresponding to the first command queue.

Certainly, the recorded real-time available storage space in the storage space that is of the network adapter memory 213 and that is corresponding to the first command queue may be represented in another form, for example, a quantity of data blocks that can be written into the storage space that is of the network adapter memory 213 and that is corresponding to the first command queue. Correspondingly, the storage space occupied by the data to be transmitted according to the first data read/write command is a quantity of data blocks to be transmitted according to the first data read/write command. Whether the storage space occupied by the data to be transmitted according to the first data read/write command is less than or equal to the recorded real-time available storage space in the storage space that is of the network adapter memory 213 and that is corresponding to the first command queue may be determined by determining whether the quantity of data blocks to be transmitted according to the first data read/write command is less than or equal to the quantity of data blocks that can be written into the storage space that is of the network adapter memory 213 and that is corresponding to the first command queue.

Step 308B: When the storage space occupied by the data to be transmitted according to the first data read/write command is less than or equal to the locally recorded real-time available storage space in the storage space that is of the network adapter memory 213 and that is corresponding to the first command queue, the host 200 sends the first data read/write command to the target 210, and subtracts the storage space occupied by the data to be transmitted according to the first data read/write command from the recorded real-time available storage space in the storage space that is of the network adapter memory 213 and that is corresponding to the first command queue, to obtain an updated locally recorded real-time available storage space in the storage space that is of the network adapter memory 213 and that is corresponding to the first command queue.

After the host 200 sends the first data read/write command, the data to be transmitted according to the first data read/write command is buffered in the storage space that is of the network adapter memory 213 and that is corresponding to the first command queue. Therefore, the storage space occupied by the data to be transmitted according to the first data read/write command needs to be subtracted from the locally recorded real-time available storage space in the storage space that is of the network adapter memory 213 and that is corresponding to the first command queue, such that the real-time available storage space in the storage space that is of the network adapter memory 213 and that is corresponding to the first command queue can be correctly recorded.

Step 310B: The host 200 suspends sending of the first data read/write command when the storage space occupied by the data to be transmitted according to the first data read/write command is greater than the locally recorded real-time available storage space in the storage space that is of the network adapter memory 213 and that is corresponding to the first command queue.

In this way, the host 200 sends the first data read/write command in the first command queue only when the data that needs to be transmitted can be buffered in the storage space that is of the network adapter memory 213 and that is corresponding to the first command queue. In this way, a problem of a complex processing mechanism caused by buffering a command in the first command queue when the available storage space in the storage space that is of the network adapter memory 213 and that is corresponding to the first command queue is insufficient can be avoided.

In the accompanying drawing, Step 310B is under Step 308B. This is merely intended to clearly set the accompanying drawing, and does not represent that Step 310B and Step 308B are performed in a sequential order. In this embodiment of the present disclosure, Step 310B and Step 308B are parallel implementation steps.

After Step 308B, the implementation provided in this embodiment of the present disclosure further includes the following steps.

Step 312B (not shown in the figure): After the data that is to be transmitted according to the first data read/write command and that is buffered in the network adapter memory 213 is migrated to a destination address, the network adapter 211 sends a response message indicating migration completion to the host 200.

The destination address to which the data to be transmitted according to the first data read/write command is migrated differs according to whether the first data read/write command is a write command or a read command. When the first data read/write command is a write command, the data to be transmitted according to the first data read/write command is migrated to a hard disk of the target 210. When the first data read/write command is a read command, the data to be transmitted according to the first data read/write command is migrated to the host 200.

Step 314B (not shown in the figure): The host 200 adds, according to the received response message, the storage space occupied by the data to be transmitted according to the first data read/write command and the locally recorded real-time available storage space in the storage space that is of the network adapter memory 213 and that is corresponding to the first command queue.

The data to be transmitted according to the first data read/write command has been migrated out from the network adapter memory 213 when the host 200 receives the response message indicating that migration of the data to be transmitted according to the first data read/write command is completed, and a corresponding available storage space is added to the storage space that is of the network adapter memory 213 and that is corresponding to the first command queue, that is, the storage space occupied by the data to be transmitted according to the first data read/write command is released. Therefore, the storage space occupied by the data to be transmitted according to the first data read/write command and the real-time available storage space, locally recorded in the host 200, in the storage space that is of the network adapter memory 213 and that is corresponding to the first command queue are added, such that the real-time available storage space in the storage space that is of the network adapter memory 213 and that is corresponding to the first command queue can be correctly recorded.

In Step 310B, the host 200 suspends sending of the first data read/write command, and may further wait for a preset time before repeating Step 306B. The preset time for which the host 200 waits may be a default preset time, or may be a preset time that is set based on a specific service requirement. After the preset time expires, the host 200 repeats Step 306B, that is, re-determines whether the storage space occupied by the data to be transmitted according to the first data read/write command is less than or equal to the locally recorded real-time available storage space in the storage space that is of the network adapter memory 213 and that is corresponding to the first command queue. Step 308B is performed if the storage space occupied by the data to be transmitted according to the first data read/write command is less than or equal to the locally recorded real-time available storage space in the storage space that is of the network adapter memory 213 and that is corresponding to the first command queue.

The host 200 repeats Step 306B after the preset time, so as to avoid occupation and consumption of a resource of the host 200 that are caused by repeating the Step of determining when the storage space that is of the network adapter memory 213 and that is corresponding to the first command queue is less than the storage space occupied by the data to be transmitted according to the first data read/write command. It may be understood that the preset time for which the host 200 waits may be flexibly adjusted based on an actual situation.

In Step 304B, the host 200 may record, at plurality locations, the real-time available storage space in the storage space that is of the network adapter memory 213 and that is corresponding to the first command queue. For example, the real-time available storage space may be recorded in a dedicated storage space of the host 200, for example, a dedicated chip that is used to store the real-time available storage space in the storage space that is of the network adapter memory 213 and that is corresponding to the first command queue. Alternatively, the real-time available storage space may be stored in an existing storage component of the host 200, for example, a cache of a CPU 201, a memory 202, or a cache of a network adapter 203, or a storage space of an FPGA chip.

In this embodiment of the present disclosure, there may be plurality implementations for the recording, by the host 200, the real-time available storage space in the storage space that is of the network adapter memory 213 and that is corresponding to the first command queue. For example, the host 200 records the real-time available storage space in a form of a table or in a form of a variable. A specific form of recording the real-time available storage space in the storage space that is of the network adapter memory 213 and that is corresponding to the first command queue is not limited in this embodiment of the present disclosure.

In the foregoing three possible implementations, regardless of Step 310A or Step 308B, after the host 200 sends the first data read/write command, the data to be transmitted according to the first data read/write command is buffered in the storage space that is of the network adapter memory 213 and that is corresponding to the first command queue. In addition, the data that is to be transmitted according to the first data read/write command and that is buffered in the network adapter memory 213 is migrated to a storage space corresponding to the destination address. The data to be transmitted according to the first data read/write command is buffered in the network adapter 211 in different manners, and the data that is to be transmitted according to the first data read/write command and that is buffered in the network adapter memory 213 is migrated in different manners. This depends on whether the first data read/write command is a write command or a read command.

In the following, the manner in which the data to be transmitted according to the first data read/write command is buffered in the network adapter 211 and the manner of migrating the buffered data are separately described in detail according to two cases: the first data read/write command is a write command and the first data read/write command is a read command.

1. The First Data Read/Write Command is a Write Command.

When the first data read/write command is a write command, the first data read/write command sent by the host 200 is a write command, and the data to be transmitted according to the first data read/write command is to-be-stored data. The write command carries an SGL. The SGL includes a field. For example, the field may be an entry. The field includes information such as a source address that is of the to-be-stored data and that is in the host 200, a length of the to-be-stored data, and a destination address that is of the to-be-stored data and that is in the target 210. It should be noted that the SGL may include plurality fields, for example, plurality entries. Each entry includes information such as a source address that is of the to-be-stored data and that is in the host 200, a length of the to-be-stored data, and a destination address that is of the to-be-stored data and that is in the target 210. When the to-be-stored data includes plurality address segments, that is, when the to-be-stored data is not continuous in the host 200 and exists in the plurality address segments, plurality entries need to be used to record the data in the plurality address segments. In an example for describing this embodiment of the present disclosure, the SGL includes one entry.

The network adapter 211 buffers, according to the source address that is carried in the SGL in the write command and that is of the to-be-stored data and in the host 200, the to-be-stored data in the storage space that is of the network adapter memory 213 and that is corresponding to the first command queue. Optionally, the network adapter 211 may receive the to-be-stored data in an RDMA manner using the network adapter 203.

After the to-be-stored data is buffered in the storage space that is of the network adapter memory 213 and that is corresponding to the first command queue, the network adapter 211 modifies the write command, and modifies the source address that is of the to-be-stored data and in the host 200 and that is carried in the write command into an address that is in the network adapter memory 213 and corresponding to the first command queue and that is used for storing the to-be-stored data, and sends the modified write command to a controller of a destination hard disk. That is, an SGL carried in the write command sent by the network adapter 211 to the controller of the destination hard disk includes information such as the address that is in the network adapter memory 213 and corresponding to the first command queue and that is used for storing the to-be-stored data, the length of to-be-stored data, and the destination address that is of the to-be-stored data and that is in the target 210.

The destination hard disk is determined by the network adapter 211 according to the destination address that is of the to-be-stored data and in the target 210 and that is in the write command. The network adapter 211 can determine, according to the destination address that is of the to-be-stored data and that is in the target 210, a hard disk that is of the target 210 and in which the to-be-stored data is located, and determine a disk in which the destination address that is of the to-be-stored data and that is in the target 210 is located as the destination hard disk. In the target 210, each hard disk is corresponding to one address segment. The network adapter 211 determines, according to the destination address that is of the to-be-stored data and in the target 210 and that is in the SGL in the write command, an address segment to which the destination address belongs. A hard disk corresponding to the address segment is the destination hard disk.

After determining the destination hard disk, the network adapter 211 sends the modified write command to the controller of the destination hard disk. The controller of the destination hard disk reads the to-be-stored data from the network adapter memory 213 according to the address that is of the to-be-stored data and in the network adapter memory 213 and that is carried in the received write command, for example, reads the to-be-stored data in an RDMA manner or a DMA manner, and writes the read to-be-stored data into a storage space corresponding to the destination hard disk.

In this embodiment of the present disclosure, the network adapter 211 may be connected to the hard disk in the target 210 based on an NVMe over PCIe architecture. Therefore, data can be transmitted or migrated between the controller of the destination hard disk in the target 210 and the network adapter 211 by means of connection and communication in the NVMe over PCIe architecture.

2. The First Data Read/Write Command is a Read Command.

When the first data read/write command is a read command, the data to be transmitted according to the first data read/write command is to-be-read data. The read command carries an SGL. The SGL includes information such as a source address that is of the to-be-read data and that is in the target 210, a length of the to-be-read data, and a destination address that is in the host 200 and into which the to-be-read data is to be written.

After receiving the read command, the network adapter 211 modifies the read command, modifies the destination address that is of the to-be-read data and in the host 200 and that is carried in the read command into an address, used for buffering the to-be-read data, in the storage space that is of the network adapter memory 213 and that is corresponding to the first command queue, and sends the modified read command to a controller of a destination hard disk. That is, an SGL carried in the read command sent by the network adapter 211 to the controller of the destination hard disk includes information such as the source address that is of the to-be-read data and that is in the target 210, the length of the to-be-read data, and the address, used for buffering the to-be-read data, in the storage space that is of the network adapter memory 213 and that is corresponding to the first command queue. The controller of the destination hard disk migrates, according to the received and modified read command, the to-be-read data to the storage space that is of the network adapter memory 213 and that is corresponding to the first command queue. Optionally, the controller of the destination hard disk migrates, in an RDMA manner, the to-be-read data to the storage space that is of the network adapter memory 213 and that is corresponding to the first command queue.

After the to-be-read data is buffered in the storage space that is of the network adapter memory 213 and that is corresponding to the first command queue, the network adapter 211 sends the buffered to-be-read data to the host 200 according to the destination address, into which the to-be-read data is to be written, that is in the host 200 and that is in the read command. Optionally, the network adapter 211 sends the buffered to-be-read data to the host 200 in an RDMA manner. Optionally, the network adapter 211 is connected to the hard disk in the target 210 based on an NVMe over PCIe architecture. The network adapter 211 and the controller of the destination hard disk in the target 210 buffer, by means of connection and communication in the NVMe over PCIe architecture, the to-be-read data in the storage space that is of the network adapter memory 213 and that is corresponding to the first command queue.

The destination hard disk is determined by the network adapter 211 according to the source address that is of the to-be-read data and in the target 210 and that is in the read command. The network adapter 211 can determine, according to the source address that is of the to-be-read data and that is in the target 210, a hard disk that is in the target 210 and in which the to-be-read data is located, and determine a hard disk in which the source address that is of the to-be-read data and that is in the target 210 is located as the destination hard disk.

Further, in the process of buffering and migrating data in the network adapter memory 213, a control module in the network adapter 211 may be used to modify the write command or the read command. The control module may be implemented by a physical chip (for example, a processor such as an ARM, X86, or a power PC), or may be implemented by a software module that runs on a physical chip, or may be one or more virtual controllers created on a physical chip using a virtual machine technology. The control module may be a physical controller or an NVM controller in NVMe over fabric.

In this embodiment of the present disclosure, the CPU 201 in the host 200 may perform the process of Step 300 and Step 304A to Step 312A or Step 304B to Step 310B. Alternatively, the network adapter 203 adapter 203 in the host 200 may perform the process of Step 300 and Step 304A to Step 312A or Step 304B to Step 310B. Alternatively, a chip or a logical component in the host 200 may perform the process of Step 300 and Step 304A to Step 312A or Step 304B to Step 310B. For example, an FPGA chip may perform the process of Step 300 and Step 304A to Step 312A or Step 304B to Step 310B.

In an actual implementation, Step 300 and Step 304A to Step 312A or Step 304B to Step 310B may be implemented using at least one of the CPU 201, the network adapter 203 or a chip or a logical component in the host 200. For example, the network adapter 203 adapter 203 performs Step 300 and Step 304A to Step 306A, and the CPU 201 performs Step 308A to Step 312A; or the network adapter 203 adapter 203 performs Step 300 and Step 304B to Step 306B, and the CPU 201 performs Step 308B to Step 310B. Alternatively, the CPU 201 performs Step 300 and Step 304A to Step 306A, and the network adapter 203 adapter 203 performs Step 308A to Step 312A; or the CPU 201 performs Step 300 and Step 304B to Step 306B, and the network adapter 203 adapter 203 performs Step 308B to Step 310B. Alternatively, a chip or a logical component in the host 200 performs Step 300 and Step 304A to Step 306A, and the CPU 201 performs Step 308A to Step 312A; or the network adapter 203 adapter 203 performs Step 300 and Step 304B to Step 306B, and a chip or a logical component in the host 200 performs Step 308B to Step 310B. A further implementation of an execution body for performing Step 300 and Step 304A to Step 312A or Step 304B to Step 310B is not limited in this embodiment of the present disclosure.

When the host 200 is implemented using a virtual machine, the CPU 201 and the network adapter 203 adapter 203 are respectively corresponding to a CPU and a network adapter in the virtual machine. The CPU and the network adapter in the virtual machine are implemented using a physical CPU and a physical network adapter that carry virtual functions of the CPU and the network adapter. An implementation of the CPU and the network adapter is similar to the foregoing implementation, and details are not described.

Figure 4A:
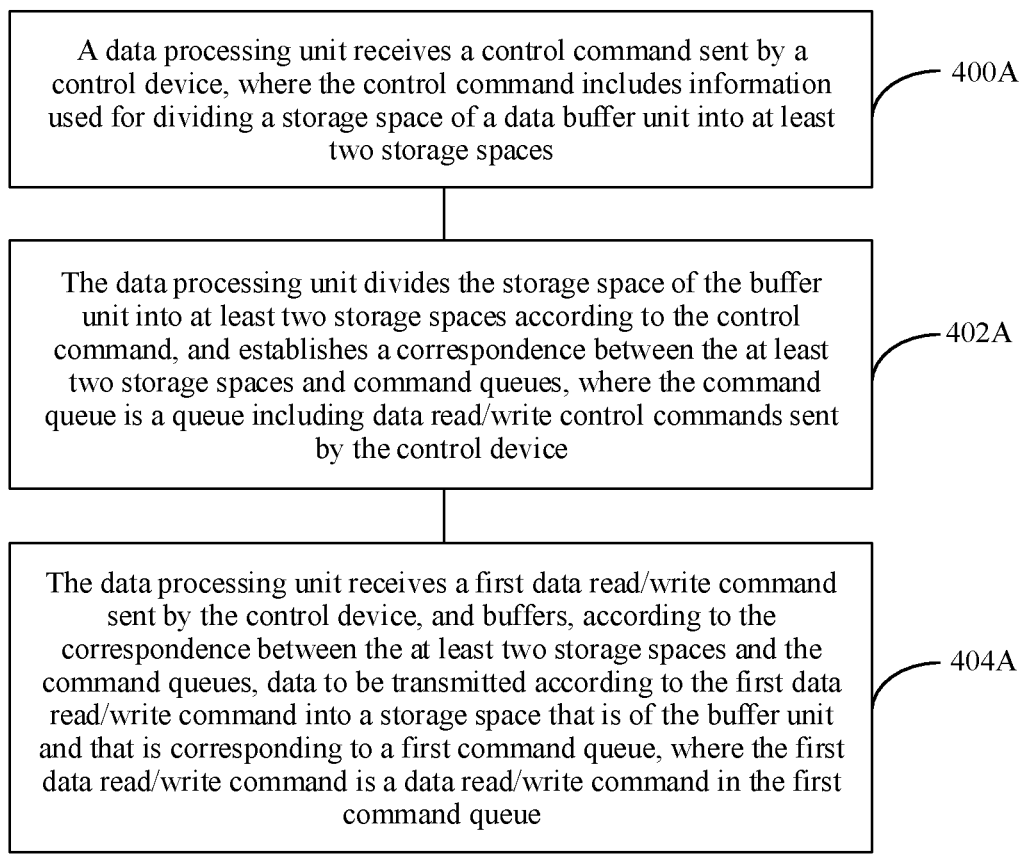
FIG. 4(A) is a schematic flowchart of a method for controlling a data read/write command between a control device and a storage device in an NVMe over fabric architecture according to an embodiment of the present disclosure.

FIG. 4(A) is a schematic flowchart of a method for controlling a data read/write command between a control device and a storage device in an NVMe over fabric architecture according to an embodiment of the present disclosure. The control method is applied to data transmission between the control device and the storage device in the NVMe over fabric architecture. The storage device includes a data processing unit, a buffer unit, and a storage unit. Data that needs to be read/written by the control device is stored in the storage unit. The data processing unit is configured to receive a data read/write command sent by the control device. The buffer unit is configured to buffer data to be transmitted according to the data read/write command. As shown in FIG. 4(A), the method includes the following steps.

Step S400A: The data processing unit receives a control command sent by the control device, where the control command includes information used for dividing a storage space of the buffer unit into at least two storage spaces.

Step S402A: The data processing unit divides the storage space of the buffer unit into at least two storage spaces according to the control command, and establishes a correspondence between the at least two storage spaces and command queues, where the command queue is a queue including a data read/write control command sent by the control device.

Step S404A: The data processing unit receives a first data read/write command sent by the control device, and buffers, according to the correspondence between the at least two storage spaces and the command queues, data to be transmitted according to the first data read/write command into a storage space that is of the buffer unit and that is corresponding to a first command queue, where the first data read/write command is a data read/write command in the first command queue.

According to the method, each storage space obtained through division in a buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

Figure 4B:
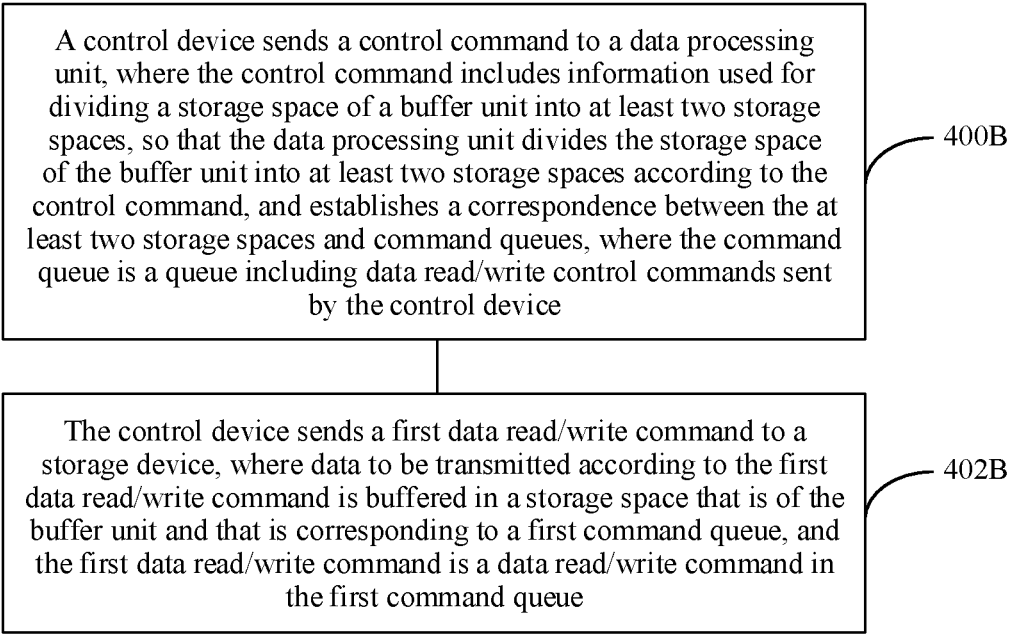
FIG. 4(B) is a schematic flowchart of another method for controlling a data read/write command between a control device and a storage device in an NVMe over fabric architecture according to an embodiment of the present disclosure.

FIG. 4(B) is a schematic flowchart of another method for controlling a data read/write command between a control device and a storage device in an NVMe over fabric architecture according to an embodiment of the present disclosure. The storage device includes a data processing unit, a buffer unit, and a storage unit. Data that needs to be read/written by the control device is stored in the storage unit. The data processing unit is configured to receive a data read/write command sent by the control device. The buffer unit is configured to buffer data to be transmitted according to the data read/write command. As shown in FIG. 4(B), the method includes the following steps.

Step S400B: The control device sends a control command to the data processing unit, where the control command includes information used for dividing a storage space of the buffer unit into at least two storage spaces, such that the data processing unit divides the storage space of the buffer unit into at least two storage spaces according to the control command, and establishes a correspondence between the at least two storage spaces and command queues, where the command queue is a queue including a data read/write control command sent by the control device.

Step S402B: The control device sends a first data read/write command to the storage device, where data to be transmitted according to the first data read/write command is buffered in a storage space that is of the buffer unit and that is corresponding to a first command queue, and the first data read/write command is a data read/write command in the first command queue.

According to the method, each storage space obtained through division in a buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

Further, for detailed implementation processes of the methods shown in FIG. 4(A) and FIG. 4(B), further refer to the implementations shown in FIG. 2 and FIG. 3A, FIG. 3B, FIG. 3C, and FIG. 3D, and details are not described. For example, the data processing unit may be implemented with reference to an implementation of the network adapter 211. The buffer unit may be implemented with reference to an implementation of the network adapter memory 213. The storage unit may be implemented with reference to the hard disk shown in FIG. 2. The control device may be implemented with reference to an implementation of the host 200. Details are not further described.

Figure 5:
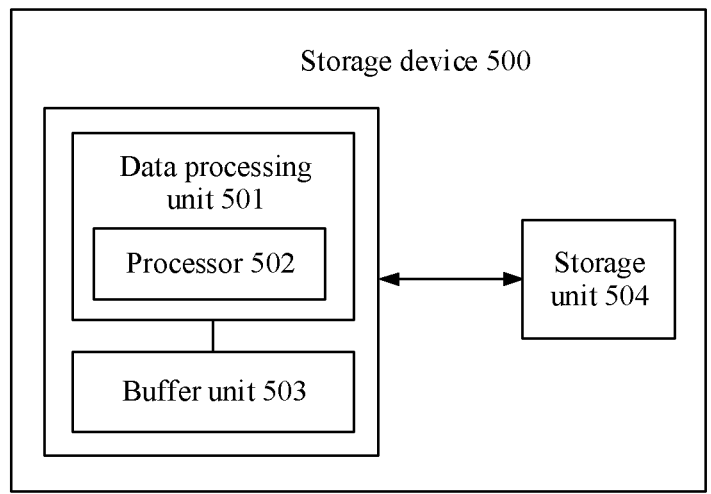
FIG. 5 is a schematic structural diagram of a storage device 500 according to an embodiment of the present disclosure.

FIG. 5 is a schematic structural diagram of a storage device 500 according to an embodiment of the present disclosure. The storage device 500 is a storage device in an NVMe over fabric architecture. Data is transmitted between the storage device 500 and a control device in the NVMe over fabric architecture. The storage device 500 includes a data processing unit 501 that further includes a processor 502 and a buffer unit 503. The data processing unit 501 is configured to receive a data read/write command sent by the control device and send and receive data to/from storage unit 504. The buffer unit 503 is configured to buffer data to be transmitted according to the data read/write command. The processor 502 is configured to perform the following steps:

receiving a control command sent by the control device, where the control command includes information used for dividing a storage space of the buffer unit 503 into at least two storage spaces;

dividing the storage space of the buffer unit 503 into at least two storage spaces according to the control command, and establishing a correspondence between the at least two storage spaces and command queues, where the command queue is a queue including a data read/write control command sent by the control device; and receiving a first data read/write command sent by the control device, and buffering, according to the correspondence between the at least two storage spaces and the command queues, data to be transmitted according to the first data read/write command into a storage space that is of the buffer unit 503 and that is corresponding to a first command queue, where the first data read/write command is a data read/write command in the first command queue.

According to the disclosure of the storage device 500, each storage space obtained through division in the buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

For a detailed implementation of the storage device 500 shown in FIG. 5 in this embodiment of the present disclosure, further refer to the implementations shown in FIG. 2 and FIG. 3A, FIG. 3B, FIG. 3C, and FIG. 3D. For example, the data processing unit 501 may be implemented with reference to an implementation of the network adapter 211. The buffer unit 502 may be implemented with reference to an implementation of the network adapter memory 213. The storage unit 503 may be implemented with reference to the hard disk shown in FIG. 2.

Figure 6:
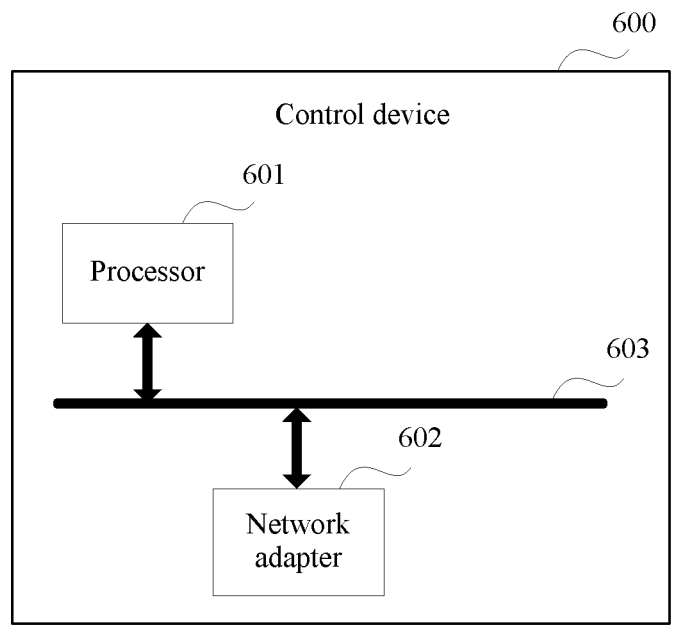
FIG. 6 is a schematic structural diagram of a control device 600 according to an embodiment of the present disclosure.

FIG. 6 is a schematic structural diagram of a control device 600 according to an embodiment of the present disclosure. The control device 600 is a control device in an NVMe over fabric architecture. The control device 600 includes a processor 601, a network adapter 602, and a bus 603. The processor 601 is connected to the network adapter 602 using the bus 603. Data is transmitted between the control device 600 and a storage device in the NVMe over fabric architecture. The storage device includes a data processing unit, a buffer unit, and a storage unit. Data that needs to be read/written by the control device 600 is buffered in the buffer unit of the storage device and stored in the storage unit of the storage device. The processor 601 is configured to perform the following steps:

send a control command to the data processing unit, where the control command includes information used for dividing a storage space of the buffer unit into at least two storage spaces, such that the data processing unit divides the storage space of the buffer unit into at least two storage spaces according to the control command, and establishes a correspondence between the at least two storage spaces and command queues, where the command queue is a queue including a data read/write control command sent by the control device; and send a first data read/write command to the storage device, where data to be transmitted according to the first data read/write command is buffered in a storage space that is of the buffer unit and that is corresponding to a first command queue, and the first data read/write command is a data read/write command in the first command queue.

According to the control device 600, a command is sent, such that each storage space obtained through division in the buffer unit is corresponding to a different command queue, and data to be transmitted according to a first data read/write command in a first command queue is buffered in a storage space corresponding to the first command queue. In this way, storage spaces of the buffer unit that are corresponding to different command queues are respectively used to buffer data to be transmitted according to data read/write commands in the corresponding command queues. Therefore, a problem that a data read/write command in a particular command queue cannot be executed because a storage space of the buffer unit is insufficient is avoided, where the storage space of the buffer unit is insufficient because data to be transmitted according to a data read/write command in another command queue occupies a large quantity of storage spaces of the buffer unit.

For a detailed implementation of the control device 600 shown in FIG. 6 in this embodiment of the present disclosure, further refer to the implementations shown in FIG. 2 and FIG. 3A, FIG. 3B, FIG. 3C, and FIG. 3D. For example, the control device 600 may be implemented with reference to an implementation of the host 200.

Figure 7:
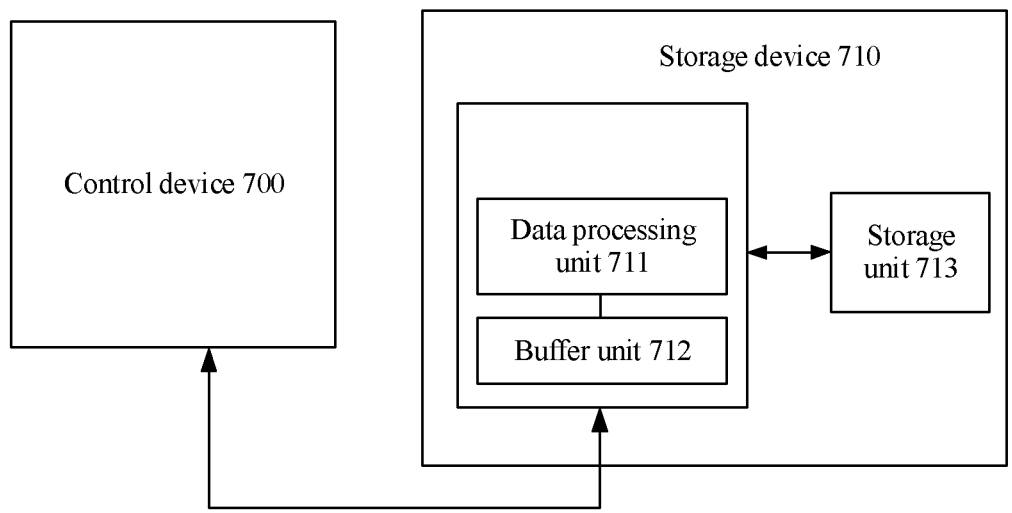
FIG. 7 is a schematic structural diagram of a system for controlling a data read/write command according to an embodiment of the present disclosure.

FIG. 7 is a schematic structural diagram of a system for controlling a data read/write command according to an embodiment of the present disclosure. As shown in FIG. 7, the system includes a control device 700 and a storage device 710. Data is transmitted between the control device 700 and the storage device 710 based on an NVMe over fabric architecture. The storage device 710 includes a data processing unit 711, a buffer unit 712, and a storage unit 713. Data that needs to be read/written by the control device 700 is stored in the storage unit 713. The data processing unit 711 is configured to receive a data read/write command sent by the control device 700. The buffer unit 712 is configured to buffer data to be transmitted according to the data read/write command.

The control device 700 is configured to send a control command to the data processing unit 711. The control command includes information used for dividing a storage space of the buffer unit 802 into at least two storage spaces.

The data processing unit 711 is configured to: divide the storage space of the buffer unit 802 into at least two storage spaces according to the control command, and establish a correspondence between the at least two storage spaces and command queues. The command queue is a queue including a data read/write control command sent by the control device 700.

The data processing unit 711 is further configured to: receive a first data read/write command sent by the control device 700, and buffer, according to the correspondence between the at least two storage spaces and the command queues, data to be transmitted according to the first data read/write command in a storage space that is of the buffer unit 712 and that is corresponding to a first command queue. The first data read/write command is a data read/write command in the first command queue.

According to the system, each storage space obtained through division in the buffer unit 712 is corresponding to a different command queue, and data to be transmitted according to a first data read/write command in a first command queue is buffered in a storage space corresponding to the first command queue. In this way, storage spaces of a network adapter memory that are corresponding to different command queues are respectively used to buffer data to be transmitted according to data read/write commands in the corresponding command queues. Therefore, a problem that a data read/write command in a particular command queue cannot be executed because a storage space of the network adapter memory is insufficient is avoided, where the storage space of the network adapter memory is insufficient because data to be transmitted according to a data read/write command in another command queue occupies a large quantity of storage spaces of the buffer unit 712.

For a detailed implementation of the system shown in FIG. 7 in this embodiment of the present disclosure, further refer to the implementations shown in FIG. 2 and FIG. 3A, FIG. 3B, FIG. 3C, and FIG. 3D. For example, the data processing unit 711 may be implemented with reference to a manner of the network adapter 211. The buffer unit 712 may be implemented with reference to an implementation of the network adapter memory 213. The storage unit 713 may be implemented with reference to an implementation of the hard disk shown in FIG. 2. The control device 700 may be implemented with reference to an implementation of the host 200.

It should be noted that, as an example for description in FIG. 7, the buffer unit 712 is inside the data processing unit 711. In a specific implementation, the buffer unit 712 may be located outside the data processing unit 711, that is, the buffer unit 712 in the storage device 710 may be a storage medium independent of the data processing unit 711, for example, a storage medium such as a DDR. Optionally, the buffer unit 712 may be a memory resource pool including storage resources of plurality data processing units in the storage device 710. A specific presentation form of the network adapter memory is not limited in this embodiment of the present disclosure.

The methods or steps described with reference to the content disclosed in the present disclosure may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. An example of the storage medium is coupled to the processor, such that the processor can read information from the storage medium, and write information into the storage medium. Certainly, the storage medium may be a component of the processor. The processor and the storage medium may be located in an ASIC. In addition, the ASIC may be located in a core network interface device. Certainly, the processor and the storage medium may be located in the core network interface device as discrete components.

A person of ordinary skill in the art may be aware that, in combination with the examples described in the embodiments disclosed in this specification, units and method steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling a data read/write command in a non-volatile memory express (NVMe) over fabric architecture system, and the method comprising:
   receiving, by a storage device having a buffer unit, a control command sent by a control device;
   dividing, by the storage device, storage space of the buffer unit of the storage device into at least two storage spaces based on correspondence information carried in the control command, wherein the correspondence information indicates a correspondence between at least two storage spaces of the buffer unit and command queues of the storage device;
   establishing, by the storage device, the correspondence between the at least two storage spaces and command queues, wherein the command queue is a queue for storing a data read/write control command, wherein data to be transmitted according to the data read/write command in the command queue can be buffered only in one corresponding storage space matching the correspondence; and
   receiving, by the storage device, a first data read/write command; and
   buffering, by the storage device according to the correspondence between the at least two storage spaces and the command queues, data to be transmitted according to the first data read/write command, into a first storage space that is of the buffer unit and that is corresponding to a first command queue, wherein the first data read/write command is a data read/write command in the first command queue.

2. The method according to claim 1, wherein the method further comprises:
   obtaining, within a preset time, an occupation proportion of the first storage space that is of the buffer unit and that is corresponding to the first command queue and an occupation proportion of a second storage space that is of the buffer unit and that is corresponding to a second command queue; and
   in response to the occupation proportion of the first storage space is greater than a preset first threshold, and the occupation proportion of the second storage space is less than a preset second threshold, reducing size of the second storage space, and allocating the reduced storage space of the second storage space to the first storage space, wherein the first threshold is greater than the second threshold.

3. The method according to claim 1 further comprising:
   sending, by a control device, a control command to the storage device, wherein the control command comprises information used for dividing the buffer unit of the storage device into at least two storage spaces; and sending, by the control device, the first data read/write command to the storage device.

4. The method according to claim 3, wherein the method further comprises:

obtaining, by the control device, an available storage space of the first storage space;

determining, by the control device, whether a storage space occupied by first data to be transmitted according to the first data read/write command is less than or equal to the available storage space of the first storage space; and sending the first data read/write command to the storage device when the storage space occupied by the first data is less than or equal to the available storage space of the first storage space; suspending sending of the first data read/write command when the storage space occupied by the first data is greater than the available storage space of the first storage space.

5. The method according to claim 3, wherein an available storage space of the first storage space is obtained by the control device by:

before sending the first data read/write command to the storage device, sending, by the control device to the storage device, a request for obtaining the available storage space of the first storage space.

6. The method according to claim 5, wherein before the sending, by the control device to the data processing unit, a request for obtaining the available storage space of the first storage space, the method further comprises:

sending, by the control device, a second data read/write command to the storage device, wherein data to be transmitted according to the second data read/write command is greater than the available storage space of the first storage space; and receiving, by the control device, a backpressure message sent by the storage device, wherein the backpressure message is used to indicate insufficiency of the available storage space of the first storage space.

7. A storage device in a non-volatile memory express (NVMe) over fabric architecture system, configured to exchange data, comprising:

a buffer unit configured to buffer data to be transmitted according to a data read/write command;

a processor configured execute computer instructions to:

receive the data read/write command sent by the control device;

receive a control command sent by the control device that comprises correspondence information used for dividing a storage space of the buffer unit into at least two storage spaces;

divide storage space of the buffer unit into at least two storage spaces according to the correspondence information carried in the control command, wherein the correspondence information indicates a correspondence between at least two storage spaces of the buffer unit and command queues of the storage device, and establish a correspondence between the at least two storage spaces and command queues, wherein the command queue is a queue for storing a data read/write control command, wherein data to be transmitted according to the data read/write command in the command queue can be buffered only in one corresponding storage space matching the correspondence; and receive a first data read/write command; and buffer, according to the correspondence between the at least two storage spaces and the command queues, data to be transmitted according to the first data read/write command, into a first storage space that is of the buffer unit and that is corresponding to a first command queue, wherein the first data read/write command is a data read/write command in the first command queue.

8. The storage device according to claim 7, wherein the processor is further configured to:

obtain, within a preset time, an occupation proportion of the first storage space that is of the buffer unit and that is corresponding to the first command queue and an occupation proportion of a second storage space that is of the buffer unit and that is corresponding to a second command queue; and in response to the occupation proportion of the first storage space is greater than a preset first threshold, and the occupation proportion of the second storage space is less than a preset second threshold, reduce size of the second storage space, and allocate the reduced storage space of the second storage space to the first storage space, wherein the first threshold is greater than the second threshold.

* * * * *